United States Patent

Limberg

[19]

[11] Patent Number: 5,982,820
[45] Date of Patent: Nov. 9, 1999

[54] BANDPASS PHASE TRACKER WITH HILBERT TRANSFORMATION BEFORE PLURAL-PHASE ANALOG-TO-DIGITAL CONVERSION

[75] Inventor: Allen LeRoy Limberg, Vienna, Va.

[73] Assignee: Samsung Electronics Co., Ltd., Kyungki-do, Rep. of Korea

[21] Appl. No.: 08/891,210

[22] Filed: Jul. 10, 1997

[51] Int. Cl.[6] ................................. H04L 27/14
[52] U.S. Cl. .................. 375/326; 375/321; 375/316
[58] Field of Search ..................... 375/316, 260, 375/321, 326, 327, 261, 320, 322; 455/150.1, 164.1, 154.1, 179.1, 182.1, 182.2, 202, 203, 204, 192.1; 329/357, 304, 347, 726, 731, 735, 725

[56] References Cited

U.S. PATENT DOCUMENTS

| 5,418,815 | 5/1995 | Ishikawa et al. | 375/216 |
| 5,602,835 | 2/1997 | Seki et al. | 370/206 |
| 5,646,935 | 7/1997 | Ishikawa et al. | 375/261 |
| 5,841,814 | 10/1995 | Cupo | 375/321 |

*Primary Examiner*—Chi H. Pham
*Assistant Examiner*—Bayard Emmanuel
*Attorney, Agent, or Firm*—Sughrue, Mion, Zinn, Macpeak & Seas, PLLC

[57] ABSTRACT

The tuner in a digital TV receiver converts received signal to a penultimate intermediate-frequency signal. Penultimate local oscillations are supplied in a first phasing and in a second phasing in quadrature therewith, for heterodyning with the penultimate IF signal in first and second mixers respectively to generate real and imaginary components of an ultimate intermediate-frequency signal. The first and second mixers are of a switching type, switching in respective response to the penultimate local oscillations as supplied in first and in second phasing. First analog-to-digital conversion circuitry containing a number N of analog-to-digital converters digitizes the real component of the ultimate IF signal on an N-phase basis, N being at least one. Second analog-to-digital conversion circuitry, which contains a number N of analog-to-digital converters, digitizes the imaginary component of the ultimate IF signal on an N-phase basis. A complex digital carrier signal is generated at the frequency of the radio carrier wave as translated to the ultimate IF signal band. Synchrodyning circuitry responds to the complex digital carrier signal supplied as ultimate local oscillations, and to the digital samples of the real and imaginary components of the ultimate IF signal, for recovering in-phase and quadrature-phase components of baseband signal.

24 Claims, 11 Drawing Sheets

BANDPASS PHASE TRACKER WITH HILBERT TRANSFORMATION BEFORE PLURAL-PHASE ANALOG-TO-DIGITAL CONVERSION

The invention relates to bandpass phase trackers used in the detection of digital signals transmitted using amplitude-modulated radio waves—e.g., of vestigial sideband (VSB) or quadrature-amplitude-modulation (QAM) type—which bandpass phase trackers are useful in digital television (DTV) receivers, for example.

BACKGROUND OF THE INVENTION

A Digital Television Standard published Sep. 16, 1995 by the Advanced Television Systems Committee (ATSC) specifies vestigial sideband (VSB) signals for transmitting digital television (DTV) signals in 6-MHz-bandwidth television channels such as those currently used in over-the-air broadcasting of National Television System Committee (NTSC) analog television signals within the United States. The radio receiver portions of the HDTV receiver used by the Advanced Television Systems Committee (ATSC) for field testing of the standard were designed by Zenith Electronics Corporation. In the Zenith receiver, phase tracking is done at baseband after synchronous detection is done. Digitization is done after synchronous detection. The digital transmission scheme authorized by the ATSC is unusual because it uses vestigial-sideband amplitude modulation (VSB AM).

In U.S. Pat. No. 5,479,449 entitled "DIGITAL VSB DETECTOR WITH BANDPASS PHASE TRACKER, AS FOR INCLUSION IN AN HDTV RECEIVER", which issued Dec. 26, 1995 to C. B. Patel and A. L. R. Limberg, digitization is done before synchronous detection; and phase tracking is done at intermediate frequencies before generating complex-number digital samples for synchronous detection. U.S. Pat. No. 5,479,449 teaches that, despite lack of symmetry of VSB AM upper and lower sidebands, phase tracking can be done at intermediate frequencies before generating complex-number digital samples for synchronous detection in VSB AM receivers. Narrow bandpass filtering is done to achieve symmetry of upper and lower sidebands before extracting carrier to be synchrodyned to baseband to develop control signal for the bandpass tracker. Alternatively, the carrier is extracted from the asymmetrical upper and lower sidebands, synchrodyned to baseband and lowpass filtered to develop control signal for the bandpass tracker, the cut-off frequency of the lowpass filter being so low in frequency that there is no response to the asymmetrical portion of the carrier sideband structure.

Bandpass phase trackers are also useful for detecting digital television signals transmitted by QAM of a center-channel carrier as described in U.S. Pat. No. 5,506,636 entitled "HDTV SIGNAL RECEIVER WITH IMAGINARY-SAMPLE-PRESENCE DETECTOR FOR QAM/VSB MODE SELECTION", which issued Apr. 9, 1996 to C. B. Patel and A. L. R. Limberg, and in allowed U.S. patent application Ser. No. 08/266,753 entitled "RADIO RECEIVER FOR RECEIVING BOTH VSB AND QAM DIGITAL HDTV SIGNALS", which was filed Jun. 28, 1994 for C. B. Patel and A. L. R. Limberg.

U.S. Pat. No. 5,479,449 digitizes the sidebands of the in-phase synchronous detection result after converting the real samples to complex samples using a digital filter with Hilbert transform system function for generating the imaginary samples. This Hilbert transformation is done by digital filtering of intermediate-frequency (IF) signals with system functions between one and ten MHz in frequency, which is considerably simpler to do than performing the Hilbert transformation at baseband. The delay required to achieve a 90° phase shift at a megahertz is considerably less than that required to approximate 90° phase shift at close to zero frequency. Nonetheless, the Hilbert transformation filter circuitry involves a substantial amount of digital hardware one would prefer to avoid having to use.

C. B. Patel and A. L. R. Limberg considered replacing the Hilbert transformation filter circuitry with differential 90° phase shift networks using FIR or IIR digital filters. U.S. Pat. No. 5,548,617 issued Aug. 20, 1996 and entitled "DIGITAL VSB DETECTOR WITH BANDPASS PHASE TRACKER USING RADER FILTERS, AS FOR USE IN AN HDTV RECEIVER" describes differential 90° phase shift networks using IIR digital filters based on a type described by C. M. Rader in his article "A Simple Method for Sampling In-Phase and Quadrature Components", IEEE TRANSACTIONS ON AEROSPACE AND ELECTRONIC SYSTEMS, Vol. AES-20, No. 6 (November 1984), pp. 821–824. In U.S. Pat. No. 5,731,848 issued Mar. 24, 1998 to C. B. Patel and A. L. R. Limberg, and entitled "DIGITAL VSB DETECTOR WITH BANDPASS PHASE TRACKER USING NG FILTERS, AS FOR USE IN AN HDTV RECEIVER" C. B. Patel and A. L. R. Limberg describe differential 90° phase shift networks using FIR digital filters based on types generally described by T. F. S. Ng in United Kingdom patent application 2 244 410 A published Nov. 27, 1991 and entitled "QUADRATURE DEMODULATOR".

The Hilbert transformation filter circuitry is implemented as a digital filter in the bandpass trackers described above after analog-to-digital conversion is performed by a single analog-to-digital converter (ADC) operative on the penultimate intermediate-frequency signal used in the receiver. This penultimate IF signal is located in the very high frequency (VHF) band somewhat below television broadcast channel two. A DTV receiver using a bandpass tracker usually will be designed as a triple-conversion receiver, converting radio-frequency (RF) signals as received from an antenna or cable connection to a first intermediate-frequency signal located in the ultra-high frequency (UHF) band somewhat above television broadcast channel eighty-three, converting amplified UHF first IF signal to the VHF penultimate IF signal, and finally converting amplified VHF penultimate IF signal to an ultimate IF signal somewhere within about a 1–10 MHz frequency range, for synchrodyning to baseband. Using a single ADC in a digital communications receiver avoids any problem of matching separate ADCs respectively used for converting a real component and an imaginary component of analog ultimate IF signal, as well as any problem of matching the gains of the real and imaginary components respectively supplied to these ADCs. Also, the problem of developing real and imaginary components of the ultimate IF signal that are in accurate 90° phasing is largely avoided.

Further, the practice when digitizing signals in a digital communications receiver has been to use a flash analog-to-digital converter, and the high 10.76 megasymbols per second symbol rate and eight- or sixteen-level symbols used in DTV signals impose very difficult operating demands on a flash converter. A flash converter has a considerable amount of circuitry for incorporation within a monolithic integrated circuit (IC) die, employing a ($2^n$-1)-resistor ladder voltage divider and ($2^n$-1) comparators to achieve n-bit digital resolution, n being a positive integer. Considerable area is taken up on the die, so ADC cost is quite high, in the several dollar range. A flash converter consumes considerable power for operating at at least 21.52 million samples per second rate as required in the receiver for digitizing VSB AM DTV signals with 10.76 million symbols per second, when a bandpass phase tracker is used. The desire to use as few expensive, power-consuming IC devices as possible directs one skilled in the art away from considering the use of plural-phase analog-to-digital conversion.

In order to get digital resolution of ten to twelve bits at 21.52 million samples per second rate, in order better to facilitate equalization filtering, the inventor has considered the use of analog-to-digital conversion methods other than flash conversion. The inventor discerns that a single flash converter can be replaced by twenty-four ADCs of successive binary approximation type arranged for staggered sampling to provide 24-phase analog-to-digital conversion with up to eleven or twelve bits resolution without need for successive binary approximation rates above DTV symbol rate. Each ADC digitizes a sample of one-half symbol period duration. Conversion rate of each ADC is one-twenty-fourth that of the flash converter, which tends to reduce power consumption by the square of twenty-four in each ADC with an overall reduction of power consumption by a factor of twenty-four. Each ADC of successive binary approximation type has only one to twelve comparators therein depending on the specific type of ADC being used, this being fewer than the $(2^9-1)$ to $(2^{12}-1)$ comparators used in a flash converter with 9-bit to 12-bit resolution and never appreciably more than the $(2^8-1)$ comparators used in a flash converter with 8-bit resolution.

The ATSC Digital Television Standard published Sep. 16, 1995 specifies symbol coding of trellis coded signals. Twelve time-interleaved trellis codes are used for data within 828-symbol data segments, each data segment being preceded by a 4-symbol data synchronization code group as a header. The original purpose of using twelve time-interleaved trellis codes was to facilitate comb filtering to suppress artifacts of co-channel interfering NTSC signal. In the Zenith receiver used for field testing the ATSC Digital Television Standard, the twelve time-interleaved trellis codes are decoded on a 12-phase basis, using a respective trellis decoder for each of the twelve phases of trellis decoding. Each trellis decoder can use a "soft decision" technique of the type described by Viterbi, which decision procedure is substantially independent of the decision procedures in the other trellis decoders. The use of independent time-interleaved trellis codes reduces the concern in regard to matching the conversion gains of the ADCs exactly, when using the 24-phase analog-to-digital conversion procedure described above. Unless ghosting is substantial, so the equalization filtering commingles ADC responses considerably, differences in the conversion gains of the ADCs are compensated for in some part by the individual "soft decision" procedures in the trellis decoders.

If ADC matching can be done satisfactorily in any case, plural-phase conversion with fewer phases, such as sixteen, should be feasible. This would reduce the amount of hardware required in the complete analog-to-digital conversion circuitry. The possibility of analog-to-digital conversion circuitry capable of providing digital resolution of ten to twelve bits at 21.52 million samples per second rate without as much power consumption or as much device cost encouraged the inventor to consider how the problems of separate analog-to-digital conversion of the real and imaginary components of the ultimate IF signal can be overcome, rather than avoided.

The problem of equalizing gains for the real and imaginary components of the ultimate IF signal as presented in analog form to their respective ADCs is capable of satisfactory solution by supplying the penultimate IF signal to a pair of switching-type mixers that are of matched construction, which switching-type mixers are switched in response to in-phase and quadrature-phase output signals of a penultimate local oscillator. The pair of switching-type mixers that are of matched construction are, for example, formed in a monolithic IC using a tree of emitter-coupled bipolar transistor pairs. The switching-type mixer responses are similarly lowpass filtered to generate respective input signals for the two ADCs. Respective LC lowpass filters designed to be driven from effectively zero source impedances are recommended for maintaining equal insertion gains for the real and imaginary components of the ultimate IF signal as presented in analog form to their respective ADCs.

The problem of developing real and imaginary components of the ultimate IF signal that are in accurate 90° phasing is solved in such an arrangement by supplying the in-phase and quadrature-phase output signals of the penultimate local oscillator in accurate phasing. This simplifies the problem since the penultimate local oscillator output signals are essentially free of modulation.

The problem of matching ADC characteristics is capable of solution, for example, by using matched constructions within a single monolithic IC. If the ADCs are flash converters, they are preferably arranged to use one resistor ladder in common. If the ADCs are of successive binary approximation type, they are preferably arranged to use the same network for establishing the comparator standards used in the successive approximation procedures.

SUMMARY OF THE INVENTION

The invention is embodied in radio receiver circuitry of the following sort, useful in digital television receivers. A tuner is included for selecting one of channels at different locations in a frequency band, which channel is allocated for transmission of amplitude-modulation of a radio carrier wave in accordance with a digital signal descriptive of television information, and frequency converting the selected channel to a penultimate intermediate-frequency signal in a penultimate intermediate-frequency band. A source of penultimate local oscillations supplies those oscillations in a first phasing and in a second phasing in quadrature with the first phasing, for heterodyning with the penultimate IF signal in first and second mixers respectively. The first and second mixers are of a switching type, the first mixer switching in accordance with the penultimate local oscillations as supplied in the first phasing for supplying a real component of an ultimate intermediate-frequency signal, and the second mixer switching in accordance with the penultimate local oscillations as supplied in the second phasing for supplying an imaginary component of the ultimate intermediate-frequency signal. A first lowpass filter separates the real component of the ultimate IF signal from its image to generate a first lowpass filter response within an ultimate intermediate-frequency band offset from baseband by at most a few megahertz. A second lowpass filter separates the imaginary component of the ultimate IF signal from its image to generate a second lowpass filter response within the ultimate IF band. First analog-to-digital conversion circuitry containing a number N of analog-to-digital converters, N being at least one, provides for digitizing said first lowpass filter response on an N-phase basis to generate as an output signal thereof digital samples of the real component of the ultimate IF signal. Second analog-to-digital conversion circuitry, which contains a number N of analog-to-digital converters, provides for digitizing the second lowpass filter response on an N-phase basis, to generate as an output signal thereof digital samples of the imaginary component of the ultimate IF signal. There is circuitry for generating a complex digital carrier signal at the frequency of the radio carrier wave as translated to the ultimate IF band. First synchrodyning circuitry responds to the complex digital carrier signal and to the digital samples of the real and imaginary components of the ultimate IF signal for recovering an in-phase baseband signal. Second synchrodyning circuitry responds to the complex digital carrier signal supplied as ultimate local oscillations, and to the digital samples of the real and imaginary components of the ultimate IF signal, for recovering a quadrature-phase baseband signal.

BRIEF DESCRIPTION OF THE DRAWING

Each of FIGS. 1–6 is a schematic diagram of a respective digital television signal receiver embodying the invention.

DETAILED DESCRIPTION

Figure 1:
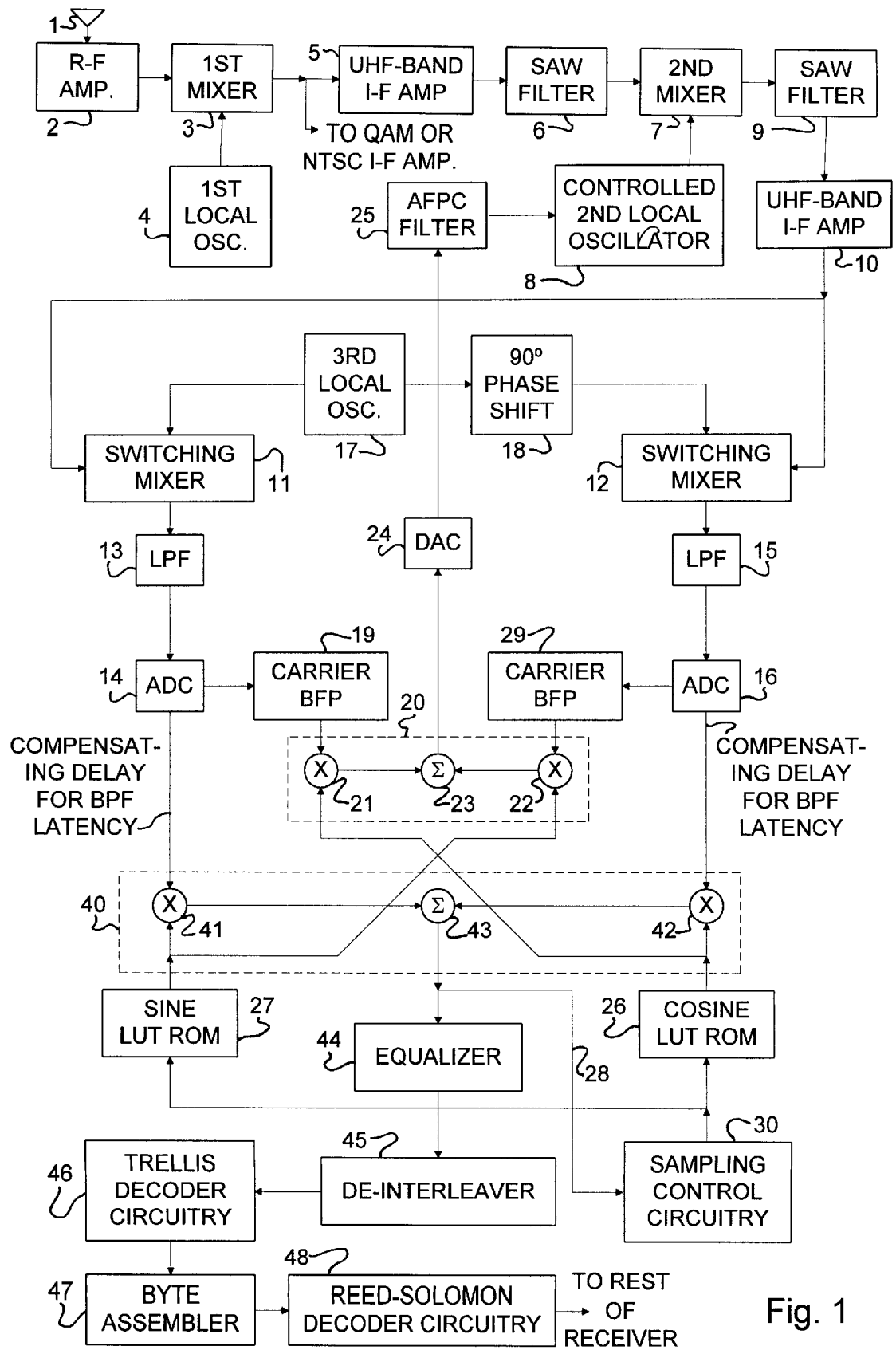

In the digital television signal receivers of FIGS. 1–6, digital television signals as received at radio frequencies by an antenna 1 (or alternatively by a cable connection not shown) are amplified by a radio-frequency amplifier 2 for application to a first mixer 3, to be heterodyned in the mixer 3 with first local oscillations generated by a first local oscillator 4. The mixer 3 translates the frequencies of a selected digital television signal to a first intermediate-frequency band, which in the plural-conversion receiver shown in FIGS. 1–6 reposes in the UHF band somewhat above television broadcast channel eighty-three. The first intermediate-frequency signal thus generated by the mixer 3 is supplied to an ultra-high-frequency-band intermediate-frequency amplifier 5, which supplies amplified first intermediate-frequency signal to a surface-acoustic-wave (SAW) filter 6 designed to select VSB AM DTV signals as translated to the first intermediate-frequency band.

In a digital signal receiver there is great concern in carefully controlling the overall amplitude and phase characteristics of the receiver in order to minimize intersymbol error, while at the same time rejecting interference from signals in adjacent channels. Getting flat amplitude response within ±dB over a bandwidth of 5.5 to 6 MHz, while maintaining acceptable group delay characteristics, requires SAW filtering with a great number of poles and zeroes to define the receiver bandwidth. It is difficult and expensive to implement such SAW filtering for a VHF band, such as 41–47 MHz. Also, the insertion loss is quite high in a VHF band, typically 15–17 dB for the 41–47 MHz band. The SAW filtering to define receiver bandwidth can be more easily implemented for a UHF band, such as at 917–923 MHz, as long as care is taken to drive the SAW filter from the optimal source impedance specified by its manufacturer. This is because the $\Delta f/f$ ratio of 6 MHz to 920 MHz is substantially lower than the $\Delta f/f$ ratio of 6 MHz to 44 MHz. Insertion losses also tend to be lower in a UHF band, typically 10–12 dB for the 917–923 MHz band.

The UHF-band IF amplifier 5 provides gain to make up for the insertion loss in the SAW filter 6. Not controlling the gain of the amplifier 5 makes it easier for the amplifier 5 to drive the SAW filter 6 from an optimal source impedance. Selected amplified first intermediate-frequency signal is supplied from the SAW filter 6 to a second mixer 7, to be heterodyned in the mixer 7 with first local oscillations generated by a controlled second local oscillator 8 in FIGS. 1, 2 and 5 and by a fixed-frequency second local oscillator 08 in FIGS. 3, 4 and 6. The mixer 7 translates the frequencies of a selected digital television signal to a second, penultimate intermediate-frequency band, which in the plural-conversion receivers shown in FIGS. 1–6 reposes in the VHF band somewhat below television broadcast channel two. A surface-acoustic-wave (SAW) filter 9 suppresses the image of the second, penultimate intermediate-frequency signal generated by the mixer 7; and the penultimate intermediate-frequency signal is then amplified by a very-high-frequency-band intermediate-frequency amplifier 10. This VHF-band IF amplifier 10 is provided with automatic gain control (AGC), and the RF amplifier is provided with delayed AGC. So, the amplified penultimate intermediate-frequency signal from the VHF-band IF amplifier 10 is of a prescribed amplitude for application to mixers 11 and 12 of switching type.

In the digital signal receivers of FIGS. 1–4, designed for receiving VSB AM DTV signals accompanied by a pilot carrier, AGC is preferably generated in response to the amplitude of the pilot carrier, as described by C. B. Patel and A. L. R. Limberg in U.S. Pat. No. 5,636,252 issued Jun. 3, 1997 and entitled "AUTOMATIC GAIN CONTROL OF RADIO RECEIVER FOR RECEIVING DIGITAL HIGH-DEFINITION TELEVISION SIGNALS". In the digital signal receivers of FIGS. 5 and 6, designed for receiving QAM DTV signals unaccompanied by a pilot carrier, AGC can be generated in any one of a number of ways. T. M. Wagner et al/i in U.S. Pat. No. 5,235,424 issued Aug. 10, 1993, entitled AUTOMATIC GAIN CONTROL SYSTEM FOR A HIGH DEFINITION TELEVISION RECEIVER, and incorporated herein by reference describe taking the square root of the sums of the squares of the real and imaginary samples of the QAM signals to develop AGC signals. In effect, this is a digital method for detecting the envelope of the QAM signal.

In each of the DTV signal receivers of FIGS. 1–6, the mixers 11 and 12 heterodyne the penultimate IF signal to generate real and imaginary components of an ultimate intermediate-frequency signal falling in a 6-MHz-wide frequency band offset from zero frequency by at most a few MHz. The real component of the ultimate intermediate-frequency signal in the mixer 11 output signal is separated from its image by a lowpass filter 13 for application to an analog-to-digital converter 14; and the imaginary component of the ultimate intermediate-frequency signal in the mixer 12 output signal is separated from its image by a lowpass filter 15 for application to an analog-to-digital converter 16.

Figure 2:
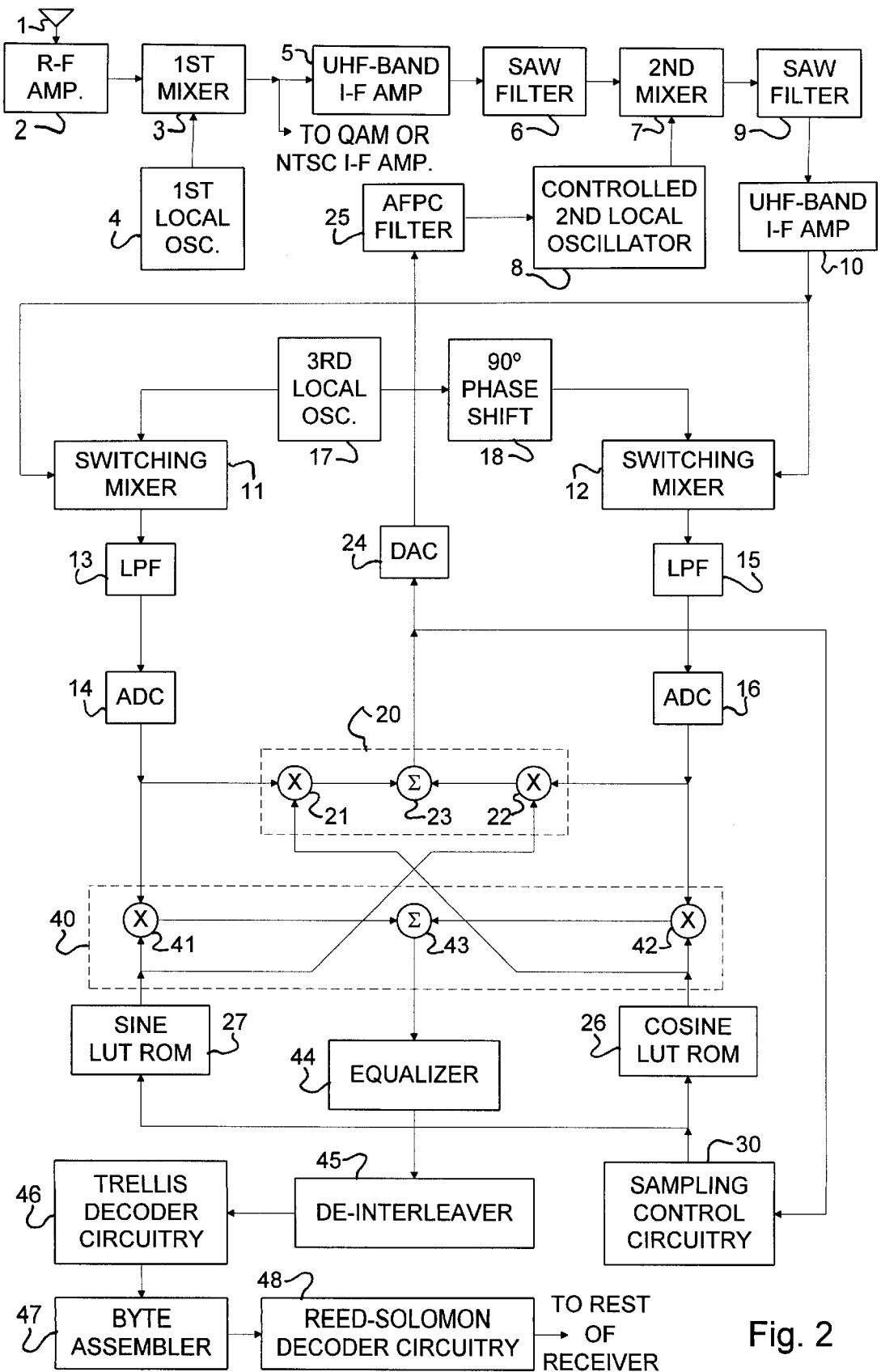

In the DTV signal receivers of FIGS. 1 and 2, switching in the mixer 11 is controlled by third local oscillations applied thereto without appreciable phase shift from a third local oscillator 17, and switching in the mixer 12 is controlled by third local oscillations phase shifted 90° by a phase shift network 18. The third local oscillations are supplied without appreciable phase jitter at fixed-frequency by the third local oscillator 17, which is advantageously a crystal-controlled oscillator.

In the FIG. 1 DTV signal receiver a synchronous detector 20 implements a synchrodyning procedure for developing quadrature-phase baseband signal from which automatic frequency and phase control (AFPC) signal is developed for the controlled second local oscillator 8. The synchronous detector 20 comprises digital multipliers 21 and 22, receiving digital samples of the real and imaginary components of ultimate IF signal carrier as their respective multiplier signals. The synchronous detector 20 further comprises a digital subtractor 23 which differentially combines the product output signals from the in multipliers 21 and 22 to generate the quadrature-phase baseband signal that the synchronous detector 20 supplies as its output signal. The responses of narrowband bandpass digital filters 19 and 29 are applied as multiplicand signals to digital multipliers 21 and 22, respectively. The filters 19 and 29 are of linear-phase finite-impulse-response (FIR) type. The filters 19 and 29 select real and imaginary components of the pilot carrier as translated to the ultimate IF band, the selections being made from real and imaginary components of the digitized ultimate IF signal supplied from the DACs 14 and 16. The difference output signal from subtractor 23 is narrow in bandwidth owing to the narrowband pilot-carrier-extraction filtering by the bandpass digital filters 19 and 20. The difference signal from the subtractor 23, which is supplied as the synchronous detector 20 output signal, is converted to analog form by digital-to-analog converter 24 and is then lowpass filtered by an AFPC filter 25 to generate AFPC signal for the controlled second local oscillator 8.

Read-only memories 26 and 27 respectively store a cosine look-up table and a sine look-up table for digitized ultimate IF signal carrier. The ROMs 26 and 27 receive input address from a sample counter in sampling control circuitry 30, the operation of which sample counter will be explained in detail further on in this specification, with reference to FIG. 11 of the drawing. The ROM 26 stores a cosine look-up table for digitized ultimate IF signal carrier, and the ROM 27 stores a sine look-up table for the digitized ultimate IF signal carrier. The ROMs 26 and 27 supply the digital samples of the real and imaginary components of ultimate IF signal carrier applied to the digital multipliers 21 and 22 as their respective multiplier signals. The ROMs 26 and 27 operate in the digital regime as an ultimate, or final, local oscillator.

The FIG. 2 DTV signal receiver differs from that of FIG. 1 in the way that AFPC signal is developed for the controlled second local oscillator 8. The synchronous detector 20 receives the real and imaginary components of the digitized ultimate IF signal directly from the DACs 14 and 16, respectively, without narrowband pilot-carrier-extraction filtering by the bandpass digital filters 19 and 20. Wideband operation of the synchronous detector 20 makes its output signal suitable for the extraction of symbol frequency therefrom. Accordingly, the synchronous detector 20 output signal is supplied via a connection 28 to the sampling control circuitry 30 where extraction of symbol frequency is performed.

In the DTV signal receivers of FIGS. 1–4 a synchronous detector 40 is implements a synchrodyning procedure for developing in-phase baseband signal. The synchronous detector 40 comprises digital multipliers 41 and 42, receiving real and imaginary components of the digitized ultimate IF signal supplied from the DACs 14 and 16 as their respective multiplicand signals. The synchronous detector 40 further comprises a digital adder 43 which additively combines the product output signals from the multipliers 41 and 42 to generate the in-phase baseband signal that the synchronous detector 40 supplies as its output signal. The digital samples of the real and imaginary components of ultimate IF signal supplied by the ROMs 26 and 27 are applied to the digital multipliers 42 and 41 as their respective multiplier signals, for implementing the synchrodyning procedure for developing the in-phase baseband signal.

The synchronous detector 40 supplies the in-phase baseband signal to an equalizer 44. FIGS. 1–4 show the equalizer 44 as constituting the complete spectrum filter before symbol decoding; however, the complete spectrum filter can include other digital filter elements, notably a comb filter for suppressing artifacts of NTSC co-channel interference. A data de-interleaver 45 commutates the equalizer 44 response into parallel streams for application to trellis decoder circuitry 46. The trellis decoder circuitry 46 conventionally uses twelve trellis decoders. The trellis decoding results are supplied from the trellis decoder circuitry 46 to a byte assembler 47 that converts the trellis decoder circuitry 46 output signals into bytes of Reed-Solomon error-correction coding for application to Reed-Solomon decoder circuitry 48, which performs Reed-Solomon decoding to generate an error-corrected byte stream. As in the DTV receivers used for field testing the ATSC Digital Television Standard, the error-corrected bytes are supplied to a data de-randomizer (not shown) and the remainder of the receiver (also not shown).

Wideband operation of the synchronous detector 40 makes its output signal suitable for the extraction of symbol frequency therefrom. Accordingly, in the DTV signal receivers of FIGS. 1 and 3, synchronous detector 40 output signal is supplied via a connection 49 to the sampling control circuitry 30, wherein extraction of symbol frequency is performed. In the DTV signal receivers of FIGS. 1 and 3 the latency or delay through the digital bandpass filters 19 and 29 must be compensated for in the connections from the ADCs 14 and 16 to the multipliers 41 and 42 in order that the same cosine and sine look-up tables can be used for supplying multiplier signals to the multipliers 42 and 41 in the synchronous detector 40 as for supplying multiplier signals to the multipliers 21 and 22 in the synchronous detector 20. These compensatory delays can be provided using portions of tapped delay lines also used in implementing the bandpass filters 19 and 29.

Figure 3:
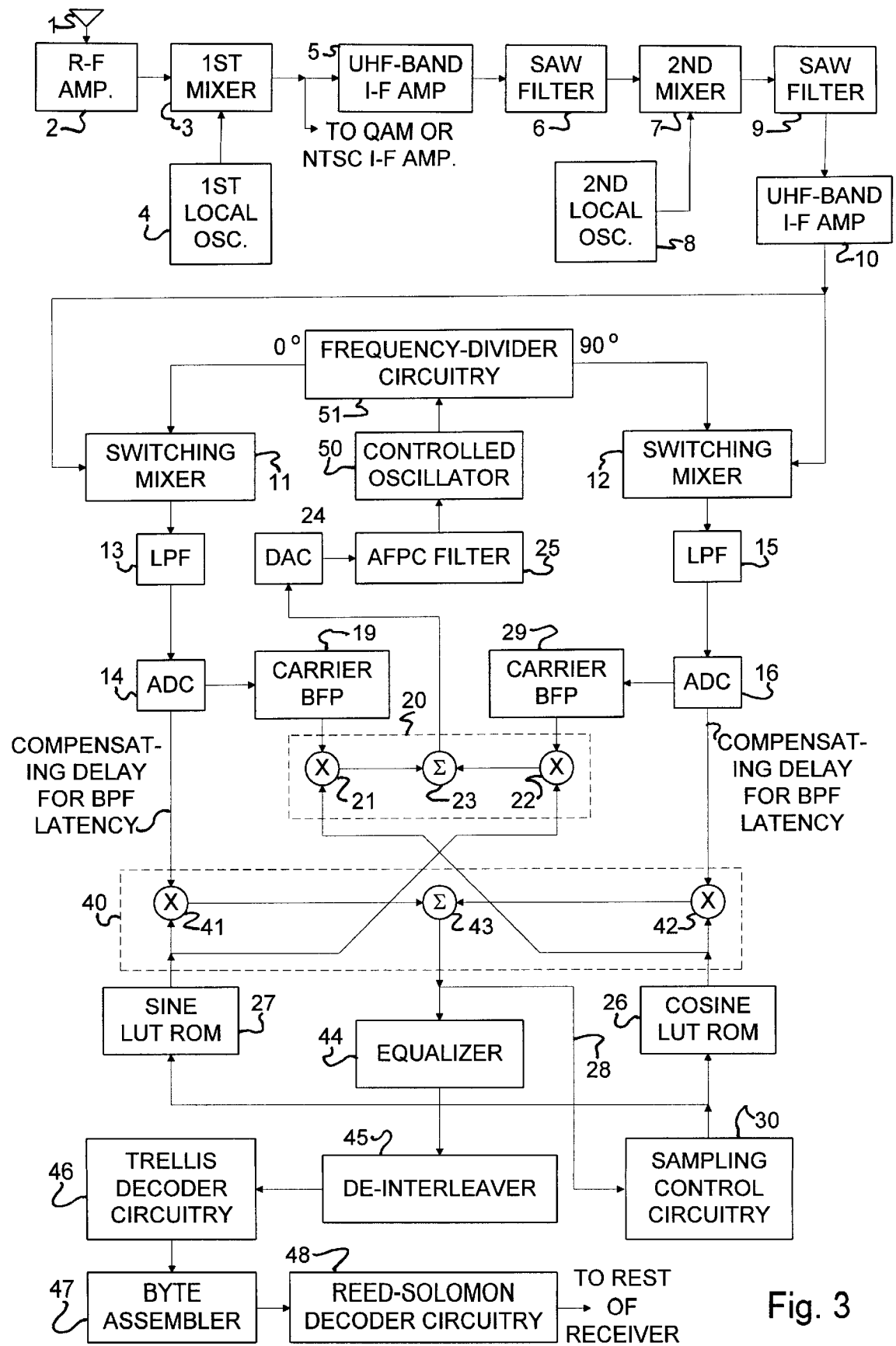
Figure 4:
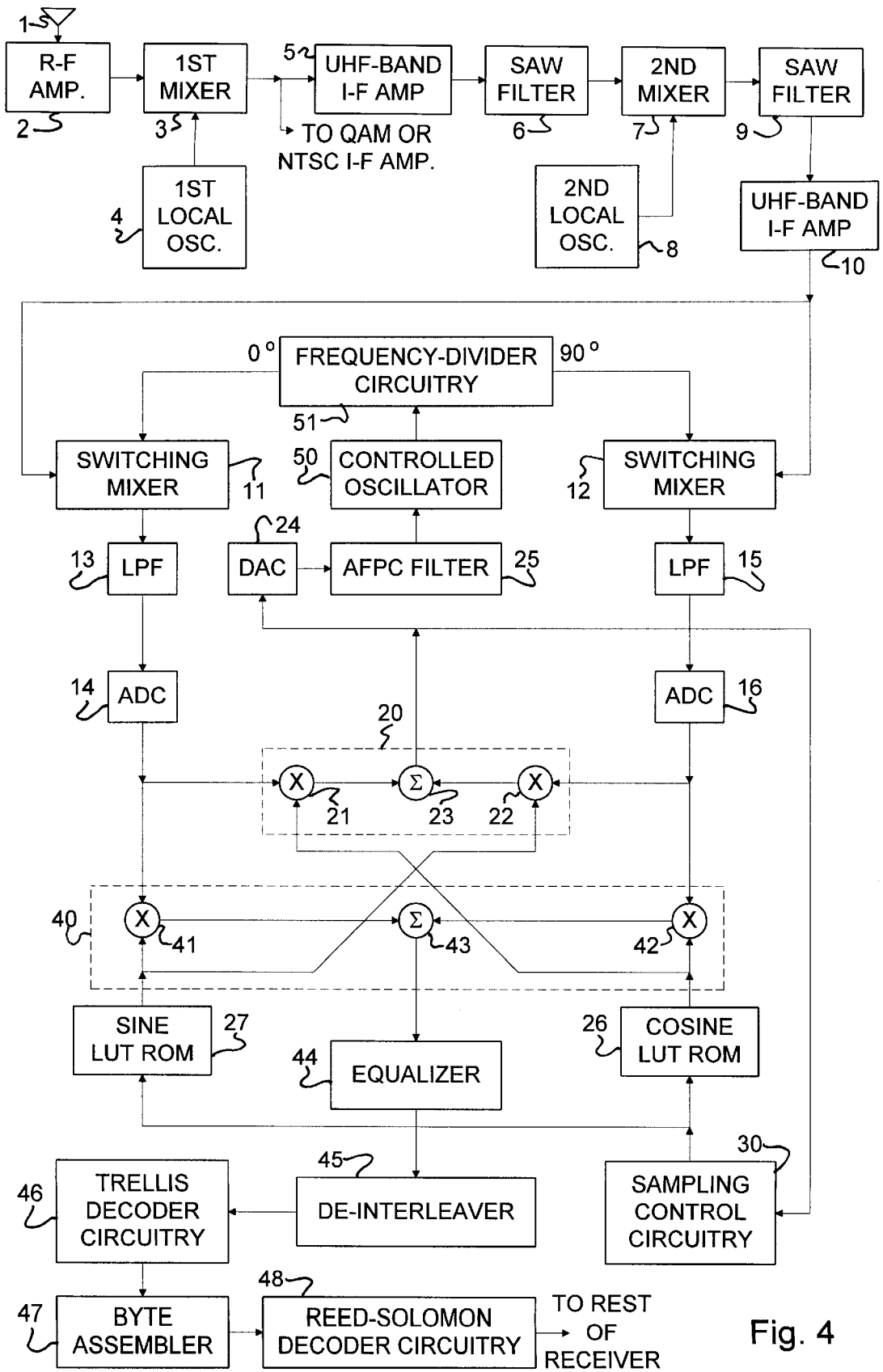

The DTV signal receivers of FIGS. 3 and 4 differ from those of FIGS. 1 and 2 in that the controlled second local oscillator 8 is replaced by a second local oscillator 08 of fixed-frequency type, which advantageously is a crystal-controlled oscillator. The DTV signal receivers of FIGS. 3 and 4 differ further from those of FIGS. 1 and 2 in that the AFPC'd third local oscillator 17 of fixed-frequency type is dispensed with together with the associated 90° phase shift network 18. Penultimate local oscillations in 0° and 90° phasings are supplied instead by frequency-dividing the oscillations of a controlled oscillator 50 in plural-output frequency dividing circuitry 51. The controlled oscillator 50 receives AFPC signal from the AFPC filter 26. Otherwise, the DTV signal receiver of FIG. 3 is similar in construction to the DTV signal receiver of FIG. 1, and the DTV signal receiver of FIG. 4 is similar in construction to the DTV signal receiver of FIG. 2.

Figure 5:
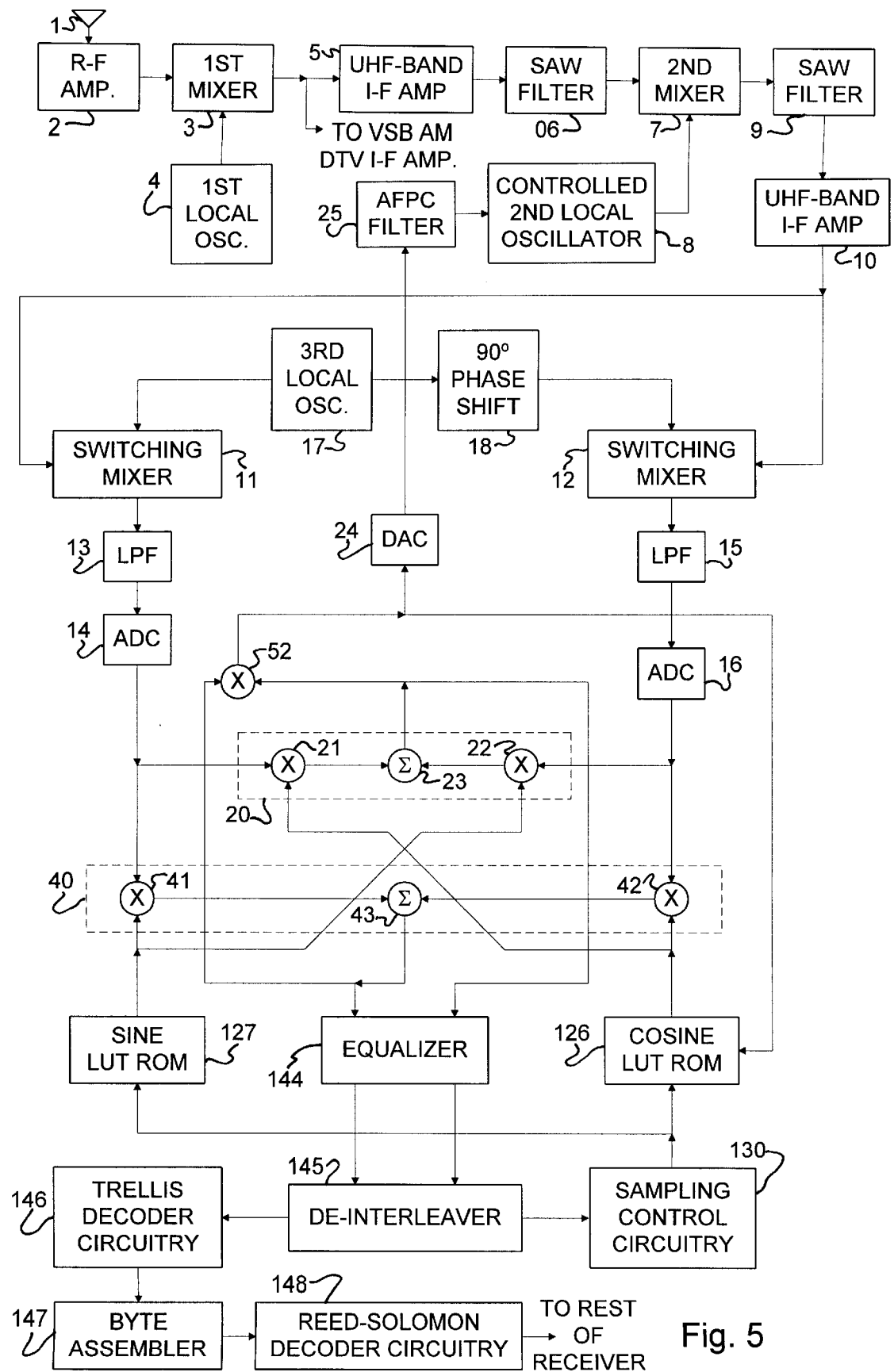
Figure 6:
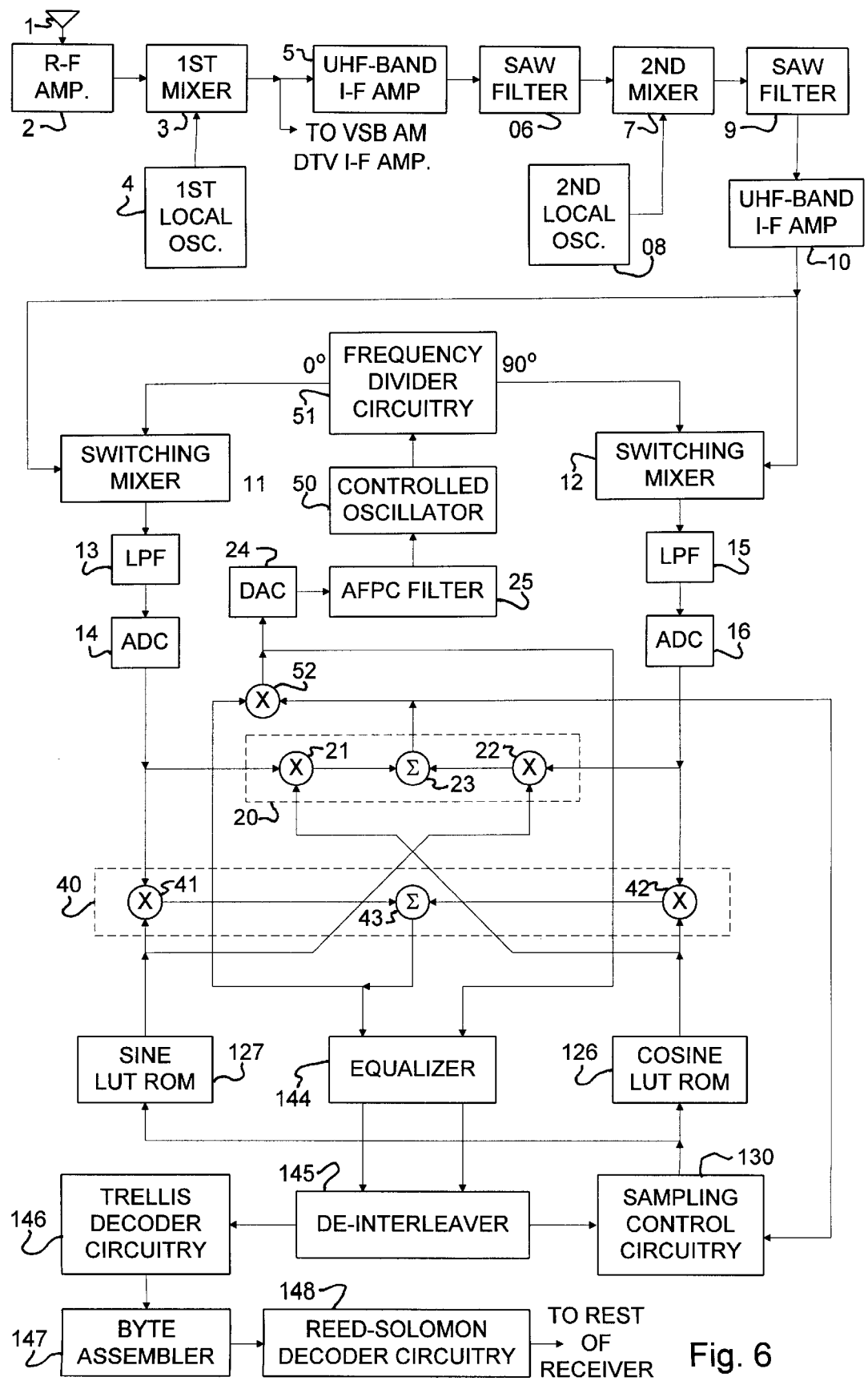

The digital signal receivers of FIGS. 5 and 6, designed for receiving QAM DTV signals unaccompanied by a pilot carrier, generally resemble the digital signal receivers of FIGS. 2 and 4, designed for receiving VSB AM DTV signals accompanied by a pilot carrier. In the FIG. 5 receiver AFPC signal for the controlled second local oscillator 8 is developed by Costas loop method. A digital multiplier 52 multiplies the quadrature-phase baseband response of the synchronous detector 20 by the in-phase baseband response of the synchronous detector 40, with the resulting product being supplied to the DAC 24 as its input signal. The AFPC filter 25 applies the direct component and lower-frequency alternating components of the DAC 24 output signal to the controlled second local oscillator 8 as AFPC signal. The FIG. 6 receiver employs the Costas loop method to develop AFPC signal for the controlled oscillator 50. The digital multiplier 52 multiplies the quadrature-phase baseband response of the synchronous detector 20 by the in-phase baseband response of the synchronous detector 40, with the resulting product being supplied to the DAC 24 as its input signal. The AFPC filter 25 applies the direct component and the lower-frequency alternating components of the DAC 24 output signal to the controlled oscillator 50 as AFPC signal.

In the digital signal receivers of FIGS. 5 and 6 elements 126, 127, 130, 144, 145, 146, 147 and 148 are generally similar to the elements 26, 27, 30, 44, 45, 46, 47 and 48 in the digital signal receivers of FIGS. 1–4. The read-only memories 126 and 127 differ from the ROMs 26 and 27 in that they store cosine and sine look-up tables for a mid-channel carrier wave as translated in frequency to the ultimate IF band, rather than storing cosine and sine look-up tables for a carrier wave 310 KHz from the lower limit frequency of the TV transmission channel as translated in frequency to the ultimate IF band.

The sampling control circuitry 130 in FIGS. 5 and 6 receives the response of the DAC 24 to the product from the multiplier 52, to be filtered for recovering symbol frequency. The sampling control circuitry 130 differs in this respect from the sampling control circuitry 30, which receives the in-phase baseband response from the synchronous detector 20 or the quadrature-phase baseband response from the synchronous detector 40 for squaring, digital-to-analog conversion and filtering for recovering symbol frequency.

The equalizer 144 operates on both in-phase baseband response from the synchronous detector 20 and quadrature-phase baseband response from the synchronous detector 40, rather than on just in-phase baseband response from the synchronous detector 20 per the equalizer 44 in the DTV signal receivers of FIGS. 1–4. Since artifacts of NTSC co-channel interference have different spectral characteristics in QAM DTV signal reception, the trellis decoder circuitry 146 for QAM DTV signal may not operate on a 12-phase basis per the trellis decoder circuitry 46 of FIGS. 1–4. In such case, the de-interleaver 145 will be of different design than the de-interleaver 45 or will be dispensed with altogether, and the byte assembler 147 will be of different design than the byte assembler 47. The byte assembler 147 will be of different design than the byte assembler 47 also if the Reed-Solomon decoder circuitry 148 is of different design than the Reed-Solomon decoder circuitry 48.

Figure 7:
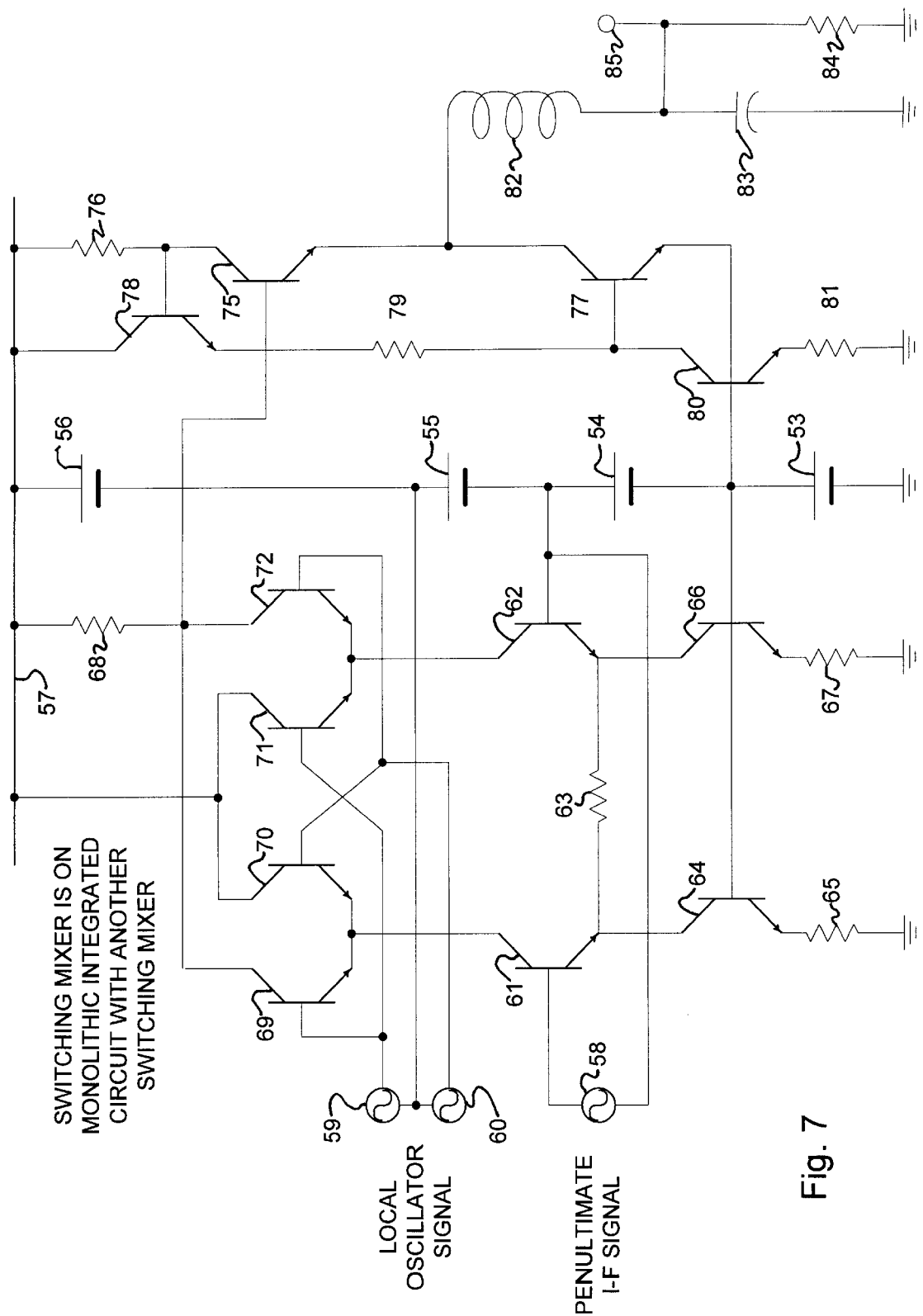
FIG. 7 is a schematic diagram of switching mixers of a type suitable for use in any of the digital television signal receivers of FIGS. 1–6.

FIG. 7 illustrates one particular way to construct the switching mixer 11 and the lowpass filter 13 thereafter. The switching mixer 12 and the lowpass filter 15 thereafter have construction identical to that of the switching mixer 11 and the lowpass filter 13 thereafter. The switching mixers 11 and 12 are preferably constructed within the confines of a single monolithic integrated circuit (IC) to facilitate such identical construction. The direct potential sources 53–56 are representative of internal voltage supply circuitry on this IC, the design of such internal voltage supply circuitry being well-known to analog IC designers. The voltage bus 57 conducts the positive operating potential supplied to the IC; and the ground connections are to a voltage bus that conducts the negative operating potential supplied to the IC, which potential is applied per custom to the substrate of the IC. The switching mixers 11 and 12 receive penultimate IF signal input from the same source 58, but each has respective sources 59 and 60 of push-pull local oscillator signal. The local oscillator signals supplied by the sources 59 and 60 in the switching mixer 12 are in quadrature with the local oscillator signals supplied by the sources 59 and 60 in the switching mixer 11. In each of the switching mixers 11 and 12 the penultimate IF signal is amplified by a differential-input amplifier comprising an emitter-coupled pair of NPN bipolar transistors 61 and 62, a resistor 63 between the emitters of the transistors 61 and 62, an NPN bipolar transistor 64 and its emitter degeneration resistor 65 connected as a constant current sink for the emitter of transistor 61, and an NPN bipolar transistor 66 and its emitter degeneration resistor 67 connected as a constant current sink for the emitter of the transistor 62. The collectors of the transistors 61 and 62 are connected to the voltage bus 57, each connection alternately being a direct connection and being a connection through a mixer output load resistor 68. The emitter degeneration that the resistor 63 provides to the transistors 61 and 62 stabilizes the conversion gain of the mixer, causing it to be fixed in ratio to the ratio of the resistances of the resistors 68 and 63.

More particularly, the collector of the transistor 61 connects to the joined emitters of NPN bipolar transistors 69 and 70, the collectors of which connect to the voltage bus 57 directly and through the mixer output load resistor 68, respectively. And the collector of the transistor 62 connects to the joined emitters of NPN bipolar transistors 71 and 72, the collectors of which connect to the voltage bus 57 directly and through the mixer output load resistor 68, respectively. The source 59 of local oscillator signal is connected between a node 73 to which the base electrodes of the transistors 69 and 72 connect and a node 74 to which the base electrodes of the transistors 70 and 71 connect.

When the local oscillator signals supplied from the sources 59 and 60 raise the voltage at node 74 positive with respect to the voltage at node 73, the transistors 69 and 72 are biased into non-conduction, and the transistors 70 and 71 are biased into conduction, to supply the collector current demand of the transistor 61 from the voltage bus 57 through the resistor 68, and to supply the collector current demand of the transistor 62 directly from the voltage bus 57. The resulting voltage swing across the mixer output load resistor 68 exhibits inverting gain respective to the penultimate IF signal input from the source 58.

When the local oscillator signals supplied from the sources 59 and 60 raise the voltage at node 73 positive with respect to the voltage at node 74, the transistors 70 and 71 are biased into non-conduction, and the transistors 69 and 72 are biased into conduction, to supply the collector current demand of the transistor 61 directly from the voltage bus 57, and to supply the collector current demand of the transistor 62 from the voltage bus 57 through the resistor 68. The resulting voltage swing across the mixer output load resistor 68 exhibits non-inverting gain respective to the penultimate IF signal input from the source 58.

The facilitate matching the conversion gains of the mixers 11 and 12, the two switching states of each mixer should exhibit equal durations. By way of example this can be arranged for by differentially driving the nodes 73 and 74 from the center-tapped secondary winding of a tuned transformer, the primary winding of which receives sinusoidal local oscillations of sufficient amplitude to guarantee 180° duration of each switching state.

The FIG. 7 switching mixer employs an NPN bipolar transistor 75 connected as a voltage follower for applying the signal appearing as a voltage drop across the mixer output load resistor 68 to the ensuing lowpass filter for suppressing image signal. To maintain the source impedance from the emitter of the voltage follower transistor 75 low over a full range of output signal voltage swing, this emitter follower transistor is provided with a shunt regulated load. The collector current of the transistor 75 causes a voltage drop across a collector resistor 76 thereof, which drop is applied through a voltage translation network to the base of an NPN bipolar transistor 77 that functions as a shunt regulator. The collector current demanded by the shunt-regulator transistor 77 from the emitter of the follower transistor 75 is increased responsive to any tendency of the transistor 75 conduction to be reduced, since the drop across the resistor 76 decreases to raise the base voltage of the transistor 77. The voltage translation network for applying the drop voltage across the resistor 76 to the base electrode of the transistor 77 comprises an NPN bipolar transistor 78 connected as an emitter follower, a dropping resistor 79 between transistor 78 emitter and transistor 77 base electrode, and an NPN bipolar transistor 80 with an emitter degeneration resistor 81, which transistor 80 is connected to demand a constant collector current flow through the dropping resistor 79 to increase the voltage drop there across.

Keeping the source impedance from the emitter of the voltage follower transistor 75 low over a full range of output signal voltage swing facilitates the lowpass filter following the mixer being a designed for "zero" source impedance to have a series inductor driven from the voltage follower transistor 75. This avoids uncertainty in regard to actual resistance values in the IC having any appreciable effect on the lowpass filter transfer characteristic. FIG. 7 shows the lowpass filter as comprising a single LC section with a series arm inductor 82, a shunt leg capacitor 83 and a termination resistor 84. Plural-section LC filters can be used alternatively, of course. The lowpass filter can be of Butterworth type. The switching mixers per FIG. 7 can be replaced by switching mixers of other types that exhibit conversion gains that are well-defined, so that a pair of switching mixers with matching characteristics can be constructed.

Figure 8:
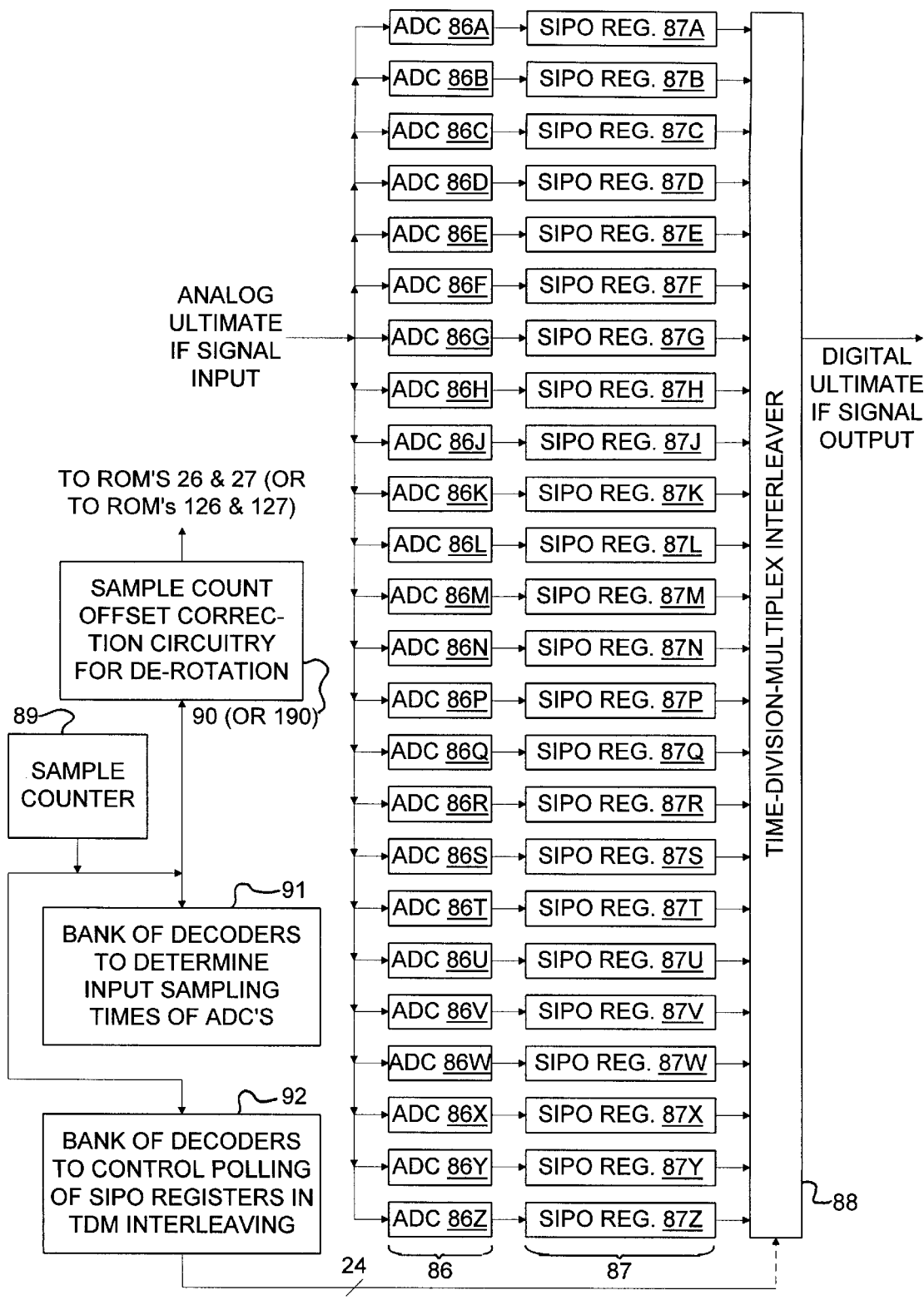
FIG. 8 is a schematic diagram showing details of the plural-phase analog-to-digital conversion carried out in preferred embodiments of the digital television signal receivers of FIGS. 1–6.

FIG. 8 shows how a plural-phase analog-to-digital converter (ADC) is constructed from a plurality of component ADCs of a successive binary approximation type. Preferably, each of the ADCs 14 and 16 in any of the DTV signal receivers of FIGS. 1–6 is of plural-phase type similar to the other ADC. FIG. 8 illustrates a 24-phase ADC using a set 86 of twenty-four component ADCs 86A, 86B, 86C, 86D, 86E, 86F, 86G, 86H, 86J, 86K, 86L, 86M, 86N, 86P, 86Q, 86R, 86S, 86T, 86U, 86V, 86W, 86X, 86Y, 86Z that sequentially and cyclically sample an analog ultimate IF signal supplied as the response of one of the lowpass filters 13 or 15. The ADCs 86A, 86B, 86C, 86D, 86E, 86F, 86G, 86H, 86J, 86K, 86L, 86M, 86N, 86P, 86Q, 86R, 86S, 86T, 86U, 86V, 86W, 86X, 86Y, 86Z each being of successive binary approximation type supply their respective output signals in serial-bit form; and a set 87 of serial-input/parallel-output registers 87A, 87B, 87C, 87D, 87E, 87F, 87G, 87H, 87J, 87K, 87L, 87M, 87N, 87P, 87Q, 87R, 87S, 87T, 87U, 87V, 87W, 87X, 87Y, 87Z convert these respective output signals to parallel-bit form. These 24-phase parallel-bit ADC responses are supplied to an interleaver 88 which time-division-multiplexes the response together to simulate the response of a single-phase flash converter.

FIG. 8 also shows elements 89–92, as included in the sampling control circuitry 30 of the DTV signal receivers of FIGS. 1–4 and in the sampling control circuitry 130 of the DTV signal receivers of FIGS. 5 and 6, and as used in common by the ADCs 14 and 16 in those receivers. A binary counter 89 is used for counting samples in each of consecutive time periods, the samples occurring at a multiple at least two of symbol rate to meet the Nyquist criterion for sampling without loss of information. Each of these consecutive time periods is presumed to have a duration of twelve symbol epochs or a multiple thereof, so that the customarily 12-phase operation of the trellis decoder circuitry 46 can be controlled by decoding the sample count from the sample counter 89 (as will be described further on in this specification, in detailed description of FIG. 9 of the drawing). The number of phases used for analog-to-digital conversion affects the duration these consecutive time periods must have, so that plural-phase analog-to-digital conversion can be controlled by decoding the sample count from the sample counter 89. Decoding of the sample count from the sample counter 89 is used to determine the timing and duration of the input sample taken in each phase of analog-to-digital conversion, and the successive binary approximations by each component ADC of the plural-phase analog-to-digital conversion circuitry is timed in accordance with the count conditions in the sample counter 89. The rate at which successive binary approximations are made can be lower than the input sampling rate, if the number of conversion phases is sufficiently large.

The preference for 24-phase analog-to-digital conversion at a rate twice symbol rate is partially founded on the fact that the time period over which the sample counter 89 reaches full count can then have a duration of only twelve symbol epochs, in addition to the fact that twelve or more bits of ADC resolution can be achieved at successive approximation rates that are the same as symbol rate. Twelve-phase analog-to-digital conversion at a rate twice symbol rate can be easily controlled by decoding the sample count from the sample counter 89 designed to reach full count over a duration of twelve symbol epochs. This can be achieved with a successive approximation rate that is the same as symbol rate, providing ADC bit-resolution requirements are eleven bits or less. Higher bit resolution practically requires successive approximation rates that are twice symbol rate, which increases ADC power consumption almost four-fold. Doubling the number of conversion phases to twenty-four, while keeping the successive approximation rate the same as symbol rate, substantially doubles overall ADC power consumption, rather than quadrupling it.

Sixteen-phase analog-to-digital conversion at a rate twice symbol rate, with successive approximation rate that is the same as symbol rate, is a possible consideration. Such 16-phase analog-to-digital conversion facilitated by the sample counter 89 being designed to reach full count over a duration of forty-eight symbol epochs, rather than just twelve symbol epochs. The savings in ADC hardware and power consumption may justify the increased complexity of the decoders used for timing ADC operation.

Twelve-phase analog-to-digital conversion at a rate twice symbol rate, with successive approximation rate that is the same as symbol rate, can be modified so that less significant bits are obtained by flash conversion, rather than successive binary approximation. This can get bit-resolution up to twelve bits or somewhat more, while conserving considerable power over flash conversion alone.

In FIGS. 8 (and 9) circuitry 90 combines a symbol phase error signal with the sample count from the sample counter 89 to generate an adjusted sample count used for addressing the ROMs 26 and 27 in the DTV signal receivers of FIGS. 1–4. A method similar to that S. U. H. Qureshi describes for use with pulse amplitude modulation (PAM) signals in his paper "Timing Recovery for Equalized Partial-Response Systems", IEEE Transactions on Communications, December 1976, pp.1326–1330 can be used to generate the symbol phase error signals from the equalizer 44 response in the DTV signal receivers of FIGS. 1–4.

Alternatively, in FIGS. 8 (and 10) circuitry 190 combines a symbol phase error signal with the sample count from the sample counter 89 to generate an adjusted sample count used for addressing the ROMs 126 and 127 in the DTV signal receivers of FIGS. 5 and 6. U.S. Pat. No. 5,115,454 issued May 19, 1992 to A. D. Kucar, entitled "METHOD AND APPARATUS FOR CARRIER SYNCHRONIZATION AND DATA DETECTION" describes several types of symbol-clock-rotation detector suitable for use in QAM DTV signal receivers and catalogues background literature describing certain of these types of detector. A particular one 195 of these symbol-clock-rotation detectors can be arranged in either of the DTV signal receivers of FIGS. 5 and 6 to generate symbol phase error signal responsive to equalizer 144 response.

In FIG. 8 a bank 91 of decoders responds to various values of sample count from the counter 89 for timing the consecutive input sampling times of the ADCs 86A, 86B, 86C, 86D, 86E, 86F, 86G, 86H, 86J, 86K, 86L, 86M, 86N, 86P, 86Q, 86R, 86S, 86T, 86U, 86V, 86W, 86X, 86Y, 86Z. The toggling of a less significant bit from one of the stages in the counter 89 clocks the successive binary approximation procedures in each of these ADCs and their serial loading of the serial-in/parallel-out registers 87A, 87B, 87C, 87D, 87E, 87F, 87G, 87H, 87J, 87K, 87L, 87M, 87N, 87P, 87Q, 87R, 87S, 87T, 87U, 87V, 87W, 87X, 87Y, 87Z these ADCs respectively supply serial-bit input signals to. A bank 92 of decoders responds to various values of sample count from the counter 89 for controlling the successive polling of the SIPO registers 87A, 87B, 87C, 87D, 87E, 87F, 87G, 87H, 87J, 87K, 87L, 87M, 87N, 87P, 87Q, 87R, 87S, 87T, 87U, 87V, 87W, 87X, 87Y, 87Z contents by the interleaver 88 to time-division-multiplex the 24-phase ADC results for generating digital ultimate IF signal.

In the case of the ADC 14 this digital ultimate IF signal is applied to the digital multipliers 21 and 41; in the case of the ADC 16 this digital ultimate IF signal is applied to the digital multipliers 22 and 42. Since the interleaver 88 time-division-multiplex output signal is composed of parallel-bit digital samples, the digital multipliers 21, 22, 41 and 42 are best implemented as read-only memories, to accommodate the high sample throughput rate.

In alternative embodiments of the invention, the single-phase multiplication procedures implemented by the multipliers 21, 22, 41 and 42 can be replaced by 24-phase multiplication procedures in which each multiplier phase includes a digital multiplier receiving serial-bit input from a respective one of the ADCs 86A, 86B, 86C, 86D, 86E, 86F, 86G, 86H, 86J, 86K, 86L, 86M, 86N, 86P, 86Q, 86R, 86S, 86T, 86U, 86V, 86W, 86X, 86Y, 86Z as multiplier signal for multiplying with a multiplicand signal loaded to an icand register from one of the digital carrier ROMs 26, 27, 126, 127. Serial-bit to parallel-bit conversion by the serial-in/parallel-out registers 87A, 87B, 87C, 87D, 87E, 87F, 87G, 87H, 87J, 87K, 87L, 87M, 87N, 87P, 87Q, 87R, 87S, 87T, 87U, 87V, 87W, 87X, 87Y, 87Z would then be deferred to take place after 24-phase subtraction by a modified subtractor 23 or after 24-phase addition by a modified adder 43. This halves the number of serial-in/parallel-out registers required as compared to the embodiments of the invention previously described. Multiplications by logical computation proceed at a rate one-twenty-fourth as fast as required for single-phase computation, saving considerable power.

Figure 9:
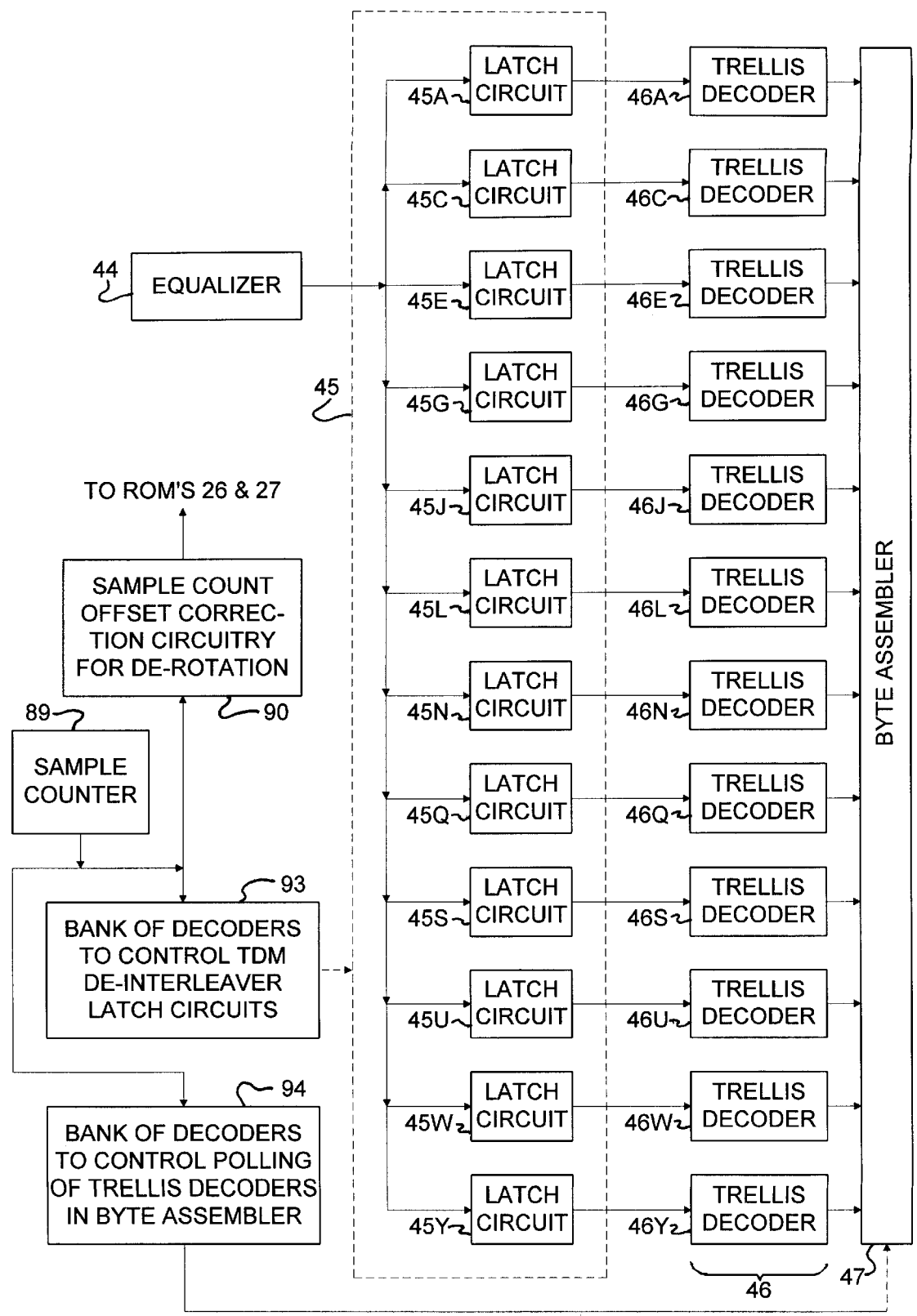
FIG. 9 is a schematic diagram showing details of the plural-phase trellis decoding carried out in particular embodiments of the digital television signal receivers of FIGS. 1–4.

FIG. 9 shows in greater detail how in the DTV signal receivers of FIGS. 1–4 the trellis coder circuitry 46 is implemented on a 12-phase basis using twelve trellis decoders 46A, 46C, 46E, 46G, 46J, 46L, 46N, 46Q, 46S, 46U, 46W, 46Y of a known form, such as one of those described in U.S. Pat. No. 5,636,251. The trellis coders can be of a type that uses "soft" decoding, such as described by Viterbi, or can be of a type that uses "hard" decoding using data-slicers with fixed boundary values. The trellis decoders 46A, 46C, 46E, 46G, 46J, 46L, 46N, 46Q, 46S, 46U, 46W, 46Y receive respective input signals from latch circuits 45A, 45C, 45E, 45G, 45J, 45L, 45N, 45Q, 45S, 45U, 45W, 45Y, respectively, within the de-interleaver 45. This set of twelve latch circuits within the de-interleaver 45 consecutively and cyclically latch alternate ones of the samples of equalizer 44 response to be temporarily stored for 12-symbol duration, thereby implementing a 2:1 decimation procedure. The latch commands for these twelve latch circuits are generated by a bank 93 of decoders responding to appropriate values of the sample count supplied by the sample counter 89. The trellis decoders 46A, 46C, 46E, 46G, 46J, 46L, 46N, 46Q, 46S, 46U, 46W, 46Y supply their respective trellis decoding results to the byte assembler 47. The byte assembler 47 interleaves the trellis decoding results and builds bytes from the interleaved trellis decoding results for application to the error-correcting Reed-Solomon decoder circuitry 48. Polling of trellis decode results from the trellis decoders 46A, 46C, 46E, 46G, 46J, 46L, 46N, 46Q, 46S, 46U, 46W, 46Y for building bytes is done by multiplexers within the byte assembler 47, which multiplexers are controlled by a bank 94 of decoders responding to appropriate values of the sample count supplied by the sample counter 89.

Figure 10:
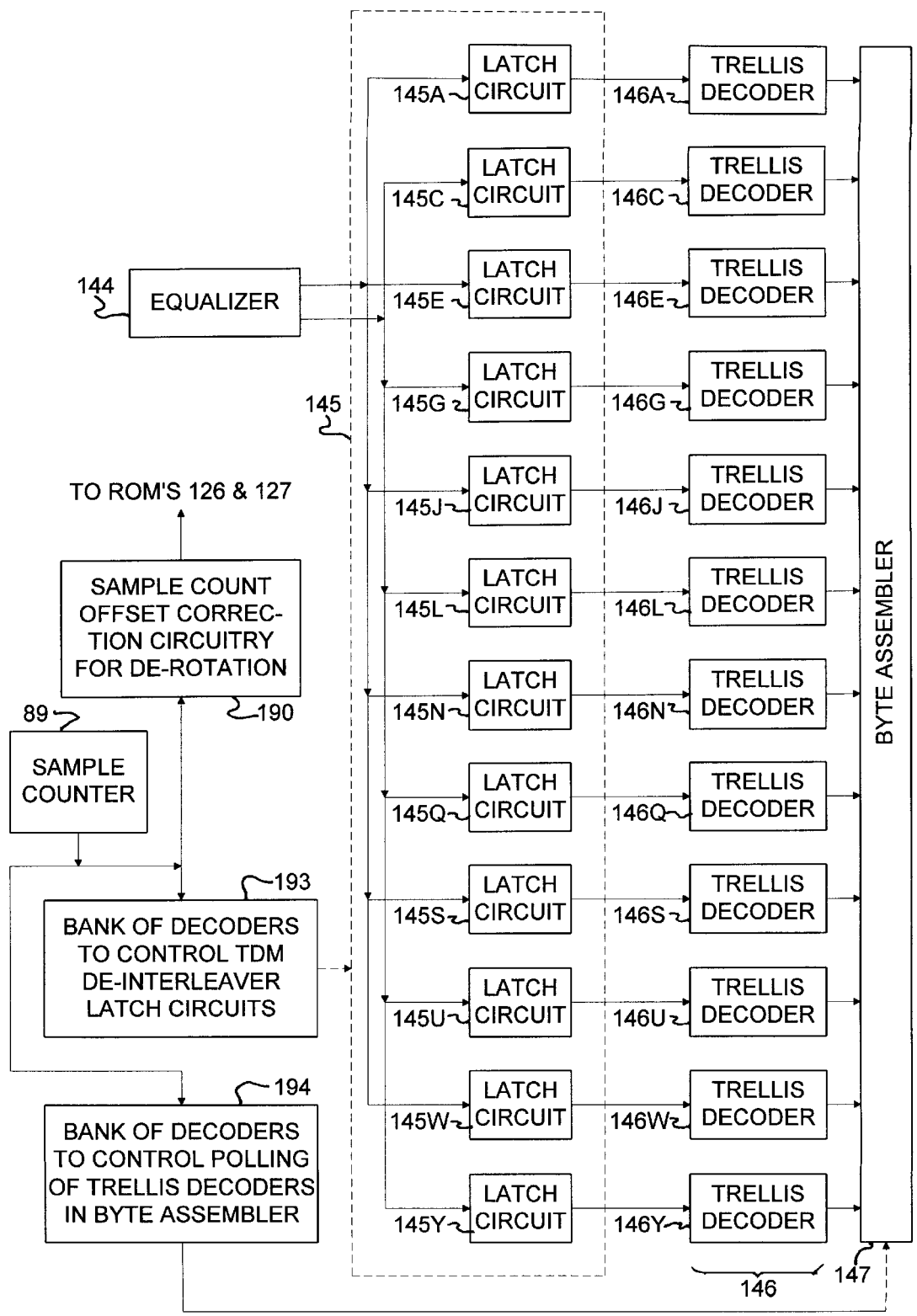
FIG. 10 is a schematic diagram showing details of the plural-phase trellis decoding carried out in particular embodiments of the digital television signal receivers of FIGS. 5 and 6.

FIG. 10 shows in greater detail how in the DTV signal receivers of FIGS. 5 and 6 the trellis coder circuitry 146 is implemented on a 12-phase basis using twelve trellis decoders 146A, 146C, 146E, 146G, 146J, 146L, 146N, 146Q, 146S, 146U, 146W, 146Y of a known form, such as one of those described in U.S. Pat. No. 5,636,251. The trellis coders can be of a type that uses "soft" decoding, such as described by Viterbi, or can be of a type that uses "hard" decoding using data-slicers with fixed boundary values. The trellis decoders 146A, 146C, 146E, 146G, 146J, 146L, 146N, 146Q, 146S, 146U, 146W, 146Y receive respective input signals from latch circuits 145A, 145C, 145E, 145G, 145J, 145L, 145N, 145Q, 145S, 145U, 145W, 145Y, respectively, within the de-interleaver 145. This set of twelve latch circuits within the de-interleaver 145 consecutively and cyclically latch samples of equalizer 144 response to be temporarily stored for 12-symbol duration. The latch commands for these twelve latch circuits are generated by a bank 193 of decoders responding to appropriate values of the sample count supplied by the sample counter 89. The trellis decoders 146A, 146C, 146E, 146G, 146J, 146L, 146N, 146Q, 146S, 146U, 146W, 146Y supply their respective trellis decoding results to the byte assembler 147. The byte assembler 147 interleaves the trellis decoding results and builds bytes from the interleaved trellis decoding results for application to the error-correcting Reed-Solomon decoder circuitry 148. Polling of trellis decode results from the trellis decoders 146A, 146C, 146E, 146G, 146J, 146L, 146N, 146Q, 146S, 146U, 146W, 146Y for building bytes is done by multiplexers within the byte assembler 147, which multiplexers are controlled by a bank 194 of decoders responding to appropriate values of the sample count supplied by the sample counter 89.

The real and imaginary responses of the equalizer 144 are independently symbol decoded in a DTV signal receiver per FIG. 10. Alternatively, complex symbols may be employed and, rather than one-dimensional trellis decoding being performed on the real component and on the imaginary component, trellis decoding can be carried forward on a two-dimensional basis.

Figure 11:
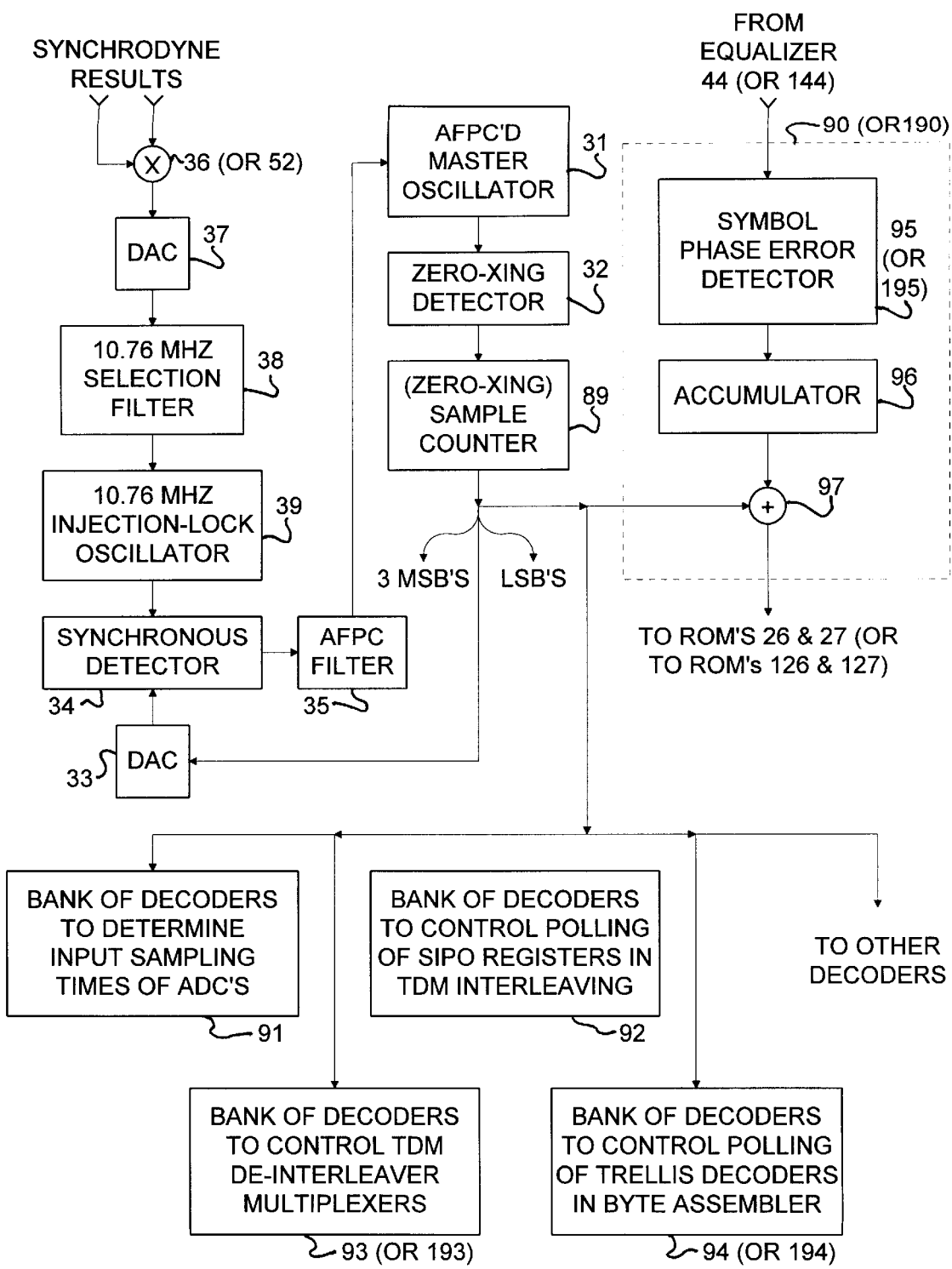
FIG. 11 is a schematic diagram showing details of the sampling control circuitry employed in particular embodiments of the digital television signal receivers of FIGS. 1–6.

FIG. 11 shows details of how the sampling control circuitry 30 is constructed. A master oscillator 31 oscillating at a frequency that is a multiple of symbol rate, as controlled in response to an automatic frequency and phase control (AFPC) signal, supplies its oscillations to a zero-crossing detector 32. The zero-crossing detector 32 detects the oscillations crossing their average value axis to generate pulses supplied to the sample counter 89 as input signal to be counted. The four most significant bits of the sample count are presumed to be binary-coded modulo-12 count of symbol periods, the fourthmost significant bit toggling at symbol rate. This fourthmost significant bit is converted to an analog signal by a digital-to-analog converter 33 for application as a square-wave carrier to a synchronous detector 34 for synchrodyning an extracted symbol frequency signal to baseband, thereafter to be lowpass filtered by an automatic frequency and phase control filter 35 to generate AFPC signal for the master oscillator 31.

In the DTV signal receivers of FIGS. 1–4 the extracted symbol frequency signal supplied to the synchronous detector 34 is generated from the product output signal supplied by a digital multiplier 36. The digital multiplier 36 is arranged to square the baseband results of a synchrodyne procedure. Preferably, the baseband results of a quadrature-phase synchrodyne procedure are obtained from the subtractor 23 for squaring by the multiplier 36, since these baseband results are unaccompanied by a direct component generated by detecting the pilot carrier of the DTV signal. Alternatively, the baseband results of an in-phase synchrodyne procedure can be obtained from the adder 43 for squaring by the multiplier 36. It is convenient to construct the digital multiplier 36, not from logic circuitry, but rather as a read-only memory storing a look-up table of squaring results. A digital-to-analog converter 37 converts the product from the digital multiplier 36 to an analog signal supplied to a bandpass filter 38 for extracting 10.76 MHz symbol frequency signal therefrom. The response of the bandpass filter 38 is supplied as locking input signal to an injection-lock oscillator 39 with a natural oscillating frequency substantially at 10.76 MHz symbol frequency. The injection-lock oscillator 39 synchronizes its oscillations with the locking input signal and supplies a constant-amplitude extracted symbol frequency signal to the synchronous detector 34 to be synchrodyned to baseband for generating an AFPC signal to be separated by the lowpass filter 35 for application to the master oscillator 31.

In regard to the DTV signal receivers of FIGS. 5 and 6, the FIG. 1 circuitry is modified, with the multiplier 36 being replaced by the digital multiplier 52, and with the banks 93 and 94 of decoders being replaced by the banks 193 and 194 of decoders. The sample count offset correction circuitry 90 is modified to a form 190 in which the symbol phase error detector 95 is replaced by a symbol phase error detector 195 that is, by way of example, one of the symbol-clock-rotation detectors described in U.S. Pat. No. 5,115,454 arranged to generate symbol phase error signal responsive to equalizer 144 response.

What is claimed is:

1. In a digital television signal receiver for use within a television system in which a plurality of transmitters each transmit via a respective one of a plurality of channels with different respective frequency allocations each said transmitter transmitting a respective radio carrier wave with amplitude-modulation that codes in multiple-amplitude-level symbols thereof a respective digital signal descriptive of television information, circuitry comprising:

a tuner for selecting for reception the radio carrier wave in one of said plurality of channels and frequency converting the amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal said penultimate local oscillations being of a frequency for heterodyning with said penultimate intermediate-frequency signal to generate within an ultimate intermediate-frequency band an amplitude-modulated carrier, the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

17 circuitry for generating a complex digital carrier signal at the frequency of said radio carrier wave as translated to said ultimate intermediate-frequency band; and first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal resulting from demodulating said amplitude modulation of said radio carrier wave selected by said tuner for reception.

2. Circuitry as set forth in claim 1, wherein N is more than one.

3. Circuitry as set forth in claim 2, wherein each said analog-to-digital converter is of successive binary approximation type.

4. Circuitry as set forth in claim 3, wherein each said analog-to-digital converter digitizes an input sample of no more than one-half symbol period duration.

5. Circuitry as set forth in claim 4, wherein N is twenty-four, and wherein each said analog-to-digital converter digitizes an input sample of one-half symbol period duration.

6. In a digital television signal receiver for use within a television system in which a plurality of transmitters each transmit via a respective one of a plurality of channels with different respective frequency allocations, each said transmitter transmitting a respective radio carrier wave with vestigial-sideband amplitude modulation and accompanied by an unmodulated pilot carrier wave of like frequency, said vestigial-sideband amplitude modulation having coded in multiple-amplitude-level symbols thereof a respective digital signal descriptive of television information, circuitry comprising:

a tuner for selecting for reception the radio carrier wave in one of said plurality of channels and frequency converting the vestigial-sideband amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency for heterodyning with said penultimate intermediate-frequency signal to generate within an ultimate intermediate-frequency band a vestigial-sideband amplitude-modulated carrier the carrier frequency of which is offset from zero frequency, the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its

18 image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band;

first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal resulting from demodulating said vestigial-sideband amplitude modulation of said radio carrier wave selected for reception by said tuner;

a first digital bandpass filter of linear-phase finite-impulse-response type receiving as its input signal said digitized samples of said real component of said ultimate intermediate-frequency signal and supplying as its output signal digitized samples of a real component of said unmodulated pilot carrier wave as translated in frequency to said ultimate intermediate-frequency band and separated from other portions of said real component of said ultimate intermediate-frequency signal;

a second digital bandpass filter of linear-phase finite-impulse-response type receiving as its input signal said digitized samples of said imaginary component of said ultimate intermediate-frequency signal and supplying as its output signal digitized samples of an imaginary component of said unmodulated pilot carrier wave as translated in frequency to said ultimate intermediate-frequency band and separated from other portions of said imaginary component of said ultimate intermediate-frequency signal;

second digital synchrodyning circuitry, responsive to said complex digital carrier signal and to said output signals of said first and second digital bandpass filters, for generating a quadrature-phase baseband signal;

circuitry for generating an automatic frequency and phase control signal in lowpass filter response to said quadrature-phase baseband signal;

an oscillator included within said tuner for supplying oscillations that are mixed with response to said radio carrier wave with vestigial sideband amplitude modulation to generate said penultimate intermediate-frequency signal, said oscillator having automatic frequency and phase control responsive to said automatic frequency and phase control signal;

a spectrum filter supplying a response to said in-phase baseband signal; and symbol decoder circuitry responsive to the response of said spectrum filter for decoding said multiple-amplitude-level symbols of said vestigial-sideband amplitude modulation of the radio carrier wave selected by said tuner for reception.

7. Circuitry as set forth in claim 6, wherein N is more than one, and wherein each said analog-to-digital converter is of successive binary approximation type.

8. Circuitry as set forth in claim 7, wherein said symbol decoder circuitry comprises:

a plurality P in number of trellis decoders for trellis decoding, on a P-phase basis, said response of said spectrum filter to said real component of baseband signal.

9. In a digital television signal receiver for use within a television system in which a plurality of transmitters each transmit via a respective one of a plurality of channels with different respective frequency allocations, each said transmitter transmitting a respective radio carrier wave with vestigial-sideband amplitude modulation and accompanied by an unmodulated pilot carrier wave of like frequency, said vestigial-sideband amplitude modulation having coded in multiple-amplitude-level symbols thereof a respective digital signal descriptive of television information, circuitry comprising:

a tuner for selecting for reception the radio carrier wave in one of said plurality of channels and frequency converting the vestigial-sideband amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency for heterodyning with said penultimate intermediate-frequency signal to generate within an ultimate intermediate-frequency band a vestigial-sideband amplitude-modulated carrier, the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band;

first digital synchrodyning circuitry responsive to said complex digital carrier signal supplied thereto as ultimate local oscillations, and to the digitized samples of said real and imaginary components of said ultimate intermediate-frequency signal for recovering an in-phase baseband signal;

a first digital bandpass filter of linear-phase finite-impulse-response type receiving as its input signal said digitized samples of said real component of said ultimate intermediate-frequency signal and supplying as its output signal digitized samples of a real component of said unmodulated pilot carrier wave as translated in frequency to said ultimate intermediate-frequency band and separated from other portions of said real component of said ultimate intermediate-frequency signal;

a second digital bandpass filter of linear-phase finite-impulse-response type receiving as its input signal said digitized samples of said imaginary component of said ultimate intermediate-frequency signal and supplying as its output signal digitized samples of an imaginary component of said unmodulated pilot carrier wave as translated in frequency to said ultimate intermediate-frequency band and separated from other portions of said imaginary component of said ultimate intermediate-frequency signal;

second digital synchrodyning circuitry, responsive to said complex digital carrier signal supplied thereto as ultimate local oscillations, and to said output signals of said first and second digital bandpass filters, for generating a quadrature-phase baseband signal;

circuitry for generating an automatic frequency and phase control signal in lowpass filter response to said quadrature-phase baseband signal;

an oscillator included within said source of penultimate local oscillations supplied in said first and second phasings, said oscillator having automatic frequency and phase control responsive to said automatic frequency and phase control signal;

a spectrum filter supplying a response to said in-phase baseband signal; and symbol decoder circuitry responsive to the response of said spectrum filter for decoding said multiple-amplitude-level symbols of said vestigial-sideband amplitude modulation of the radio carrier wave selected by said tuner for reception.

10. Circuitry as set forth in claim 9, wherein N is more than one, and wherein each said analog-to-digital converter is of successive binary approximation type.

11. Circuitry as set forth in claim 10, wherein said symbol decoder circuitry comprises:

a plurality P in number of trellis decoders for trellis decoding on a P-phase basis said response of said spectrum filter to said real component of baseband signal, P being equal to N or a multiple thereof.

12. In a digital television signal receiver for use within a television system in which a plurality of transmitters each transmit via a respective one of a plurality of channels with different respective frequency allocations, each said transmitter transmitting a respective radio carrier wave with vestigial-sideband amplitude modulation and accompanied by an unmodulated pilot carrier wave of like frequency, said vestigial-sideband amplitude modulation having coded in multiple-amplitude-level symbols thereof a respective digital signal descriptive of television information, circuitry comprising:

a tuner for selecting for reception the radio carrier wave in one of said plurality of channels and frequency converting the vestigial-sideband amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency for heterodyning with said penultimate intermediate-frequency signal to generate within an ultimate intermediate-frequency band a vestigial-sideband amplitude-modulated carrier, the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band;

first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal resulting from demodulating said vestigial-sideband amplitude modulation of said radio carrier wave selected for reception by said tuner;

second digital synchrodyning circuitry, responsive to said complex digital carrier signal and to the digitized samples of said real and imaginary components of said ultimate intermediate-frequency signal, for generating a quadrature-phase baseband signal;

circuitry for generating an automatic frequency and phase control signal in lowpass filter response to said quadrature-phase baseband signal;

an oscillator included within said tuner for supplying oscillations that are mixed with response to said radio carrier wave with vestigial sideband amplitude modulation to generate said penultimate intermediate-frequency signal, said oscillator having automatic frequency and phase control responsive to said automatic frequency and phase control signal;

a spectrum filter supplying a response to said in-phase baseband signal; and symbol decoder circuitry responsive to the response of said spectrum filter for decoding said multiple-amplitude-level symbols of said vestigial-sideband amplitude modulation of the radio carrier wave selected by said tuner for reception.

13. Circuitry as set forth in claim 12, wherein N is more than one, and wherein each said analog-to-digital converter is of successive binary approximation type.

14. Circuitry as set forth in claim 13, wherein said symbol decoder circuitry comprises:

a plurality P in number of trellis decoders for trellis decoding on a P-phase basis said response of said spectrum filter to said real component of baseband signal, P being equal to N or a multiple thereof.

15. In a digital television signal receiver for use within a television system in which a plurality of transmitters each transmit via a respective one of a plurality of channels with different respective frequency allocations, each said transmitter transmitting a respective radio carrier wave with vestigial-sideband amplitude modulation and accompanied by an unmodulated pilot carrier wave of like frequency, said vestigial-sideband amplitude modulation having coded in multiple-amplitude-level symbols thereof a respective digital signal descriptive of television information, circuitry comprising:

a tuner for selecting for reception the radio carrier wave in one of said plurality of channels and frequency converting the vestigial-sideband amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency for heterodyning with said penultimate intermediate-frequency signal to generate within an ultimate intermediate-frequency band a vestigial-sideband amplitude-modulated carrier, the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band, first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band;

first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal resulting from demodulating said vestigial-sideband amplitude modulation of said radio carrier wave selected for reception by said tuner;

second digital synchrodyning circuitry, responsive to said complex digital carrier signal and to the digitized samples of said real and imaginary components of said ultimate intermediate-frequency signal, for generating a quadrature-phase baseband signal;

circuitry for generating an automatic frequency and phase control signal in lowpass filter response to said quadrature-phase baseband signal;

an oscillator included within said source of penultimate local oscillations supplied in said first and second phasings, said oscillator having automatic frequency and phase control responsive to said automatic frequency and phase control signal;

a spectrum filter supplying a response to said in-phase baseband signal; and symbol decoder circuitry responsive to the response of said spectrum filter for decoding said multiple-amplitude-level symbols of said vestigial-sideband amplitude modulation of the radio carrier wave selected by said tuner for reception.

16. Circuitry as set forth in claim 15, wherein N is more than one, and wherein each said analog-to-digital converter is of successive binary approximation type.

17. Circuitry as set forth in claim 16, wherein said symbol decoder circuitry comprises:

a plurality P in number of trellis decoders for trellis decoding on a P-phase basis said response of said spectrum filter to said real component of baseband signal, P being equal to N or a multiple thereof.

18. In a digital television signal receiver for use within a television system in which a plurality of transmitters each transmit via a respective one of a plurality of channels with different respective frequency allocations, each said transmitter transmitting a respective radio carrier wave with quadrature amplitude modulation, said quadrature amplitude modulation having coded in multiple-amplitude-level symbols thereof a respective digital signal descriptive of television information, circuitry comprising:

a tuner for selecting for reception the radio carrier wave in one of said plurality of channels and frequency converting the quadrature-amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency for heterodyning with said penultimate intermediate-frequency signal to generate within an ultimate intermediate-frequency band a quadrature-amplitude-modulated carrier the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band;

first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal;

second digital synchrodyning circuitry, responsive to said complex digital carrier signal supplied thereto as ultimate local oscillations, and to the digitized samples of said real and imaginary components of said ultimate intermediate-frequency signal, for generating a quadrature-phase baseband signal;

circuitry for generating an automatic frequency and phase control signal in response to a product generated by multiplying together said in-phase baseband signal and said quadrature-phase baseband signal;

an oscillator included within said tuner for supplying oscillations that are mixed with response to said radio carrier wave with vestigial sideband amplitude modulation to generate said penultimate intermediate-frequency signal, said oscillator having automatic frequency and phase control responsive to said automatic frequency and phase control signal;

a spectrum filter supplying in-phase and quadrature-phase demodulation responses to said in-phase baseband signal and said quadrature-phase baseband signal; and symbol decoder circuitry responsive to said in-phase and quadrature-phase demodulation responses for decoding said multiple-amplitude-level symbols of said quadrature amplitude modulation of the quadrature-amplitude-modulated radio carrier wave selected by said tuner for reception.

19. Circuitry as set forth in claim 18, wherein N is more than one, and wherein each said analog-to-digital converter is of successive binary approximation type.

20. Circuitry as set forth in claim 19, wherein said symbol decoder circuitry comprises:

a plurality P in number of trellis decoders for trellis decoding on a P-phase basis said response of said spectrum filter to said real component of baseband signal, P being equal to N or a multiple thereof.

21. In a digital television signal receiver for use within a television system in which a plurality of transmitters each transmit via a respective one of a plurality of channels with different respective frequency allocations, each said transmitter transmitting a respective radio carrier wave with quadrature amplitude modulation, said quadrature amplitude modulation coding in multiple-amplitude-level symbols thereof a respective digital signal descriptive of television information, circuitry comprising:

a tuner for selecting for reception the radio carrier wave in one of said plurality of channels and frequency converting the quadrature-amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency for heterodyning with said penultimate intermediate-frequency signal to generate within an ultimate intermediate-frequency band a quadrature-amplitude-modulated carrier, the lowermost frequency of said ultimate intermediate-frequency band being above zero frequency and the uppermost frequency of said ultimate intermediate-frequency band being at most a few megahertz;

first and second mixers of a switching type connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band;

first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal;

second digital synchrodyning circuitry, responsive to said complex digital carrier signal and to the digitized samples of said real and imaginary components of said ultimate intermediate-frequency signal, for generating a quadrature-phase baseband signal;

circuitry for generating an automatic frequency and phase control signal in response to a product generated by multiplying together said in-phase baseband signal and said quadrature-phase baseband signal;

an oscillator included within said source of penultimate local oscillations supplied in said first and second phasings, said oscillator having automatic frequency and phase control responsive to said automatic frequency and phase control signal;

a spectrum filter supplying in-phase and quadrature-phase demodulation responses to said in-phase baseband signal and said quadrature-phase baseband signal; and symbol decoder circuitry responsive to said in-phase and quadrature-phase demodulation responses for decoding said multiple-amplitude-level symbols of said quadrature amplitude modulation of the quadrature-amplitude-modulated radio carrier wave selected by said tuner for reception.

22. Circuitry as set forth in claim 21, wherein N is more than one, and wherein each said analog-to-digital converter is of successive binary approximation type.

23. Circuitry as set forth in claim 22, wherein said symbol decoder circuitry comprises:

a plurality P in number of trellis decoders for trellis decoding on a P-phase basis said response of said spectrum filter to said real component of baseband signal, P being equal to N or a multiple thereof.

24. In a digital television signal receiver for use within a television system in which a plurality of transmitters each transmit via a respective one of a plurality of channels with different respective frequency allocations, each said transmitter transmitting a respective radio carrier wave with amplitude-modulation that codes in multiple-amplitude-level symbols thereof a respective digital signal descriptive of television information, circuitry comprising:

a tuner for selecting for reception the radio carrier wave in one of said plurality of channels and frequency converting the amplitude-modulated radio carrier wave so selected to a penultimate intermediate-frequency signal in a penultimate intermediate-frequency band;

a source of penultimate local oscillations supplied in a first phasing and in a second phasing in quadrature with said first phasing for heterodyning with said penultimate intermediate-frequency signal, said penultimate local oscillations being of a frequency that heterodynes with said penultimate intermediate-frequency signal to generate within an ultimate intermediate-frequency band an amplitude-modulated carrier, the lowermost frequency of said ultimate intermediate-frequency band being above zero frequency and the uppermost frequency of said ultimate intermediate-frequency band being at most a few megahertz;

first and second mixers connected to receive said penultimate intermediate-frequency signal for said heterodyning with said penultimate local oscillations, said first mixer switching in accordance with said penultimate local oscillations as supplied in said first phasing for supplying a real component of said ultimate intermediate-frequency signal, and said second mixer switching in accordance with said penultimate local oscillations as supplied in said second phasing for supplying an imaginary component of said ultimate intermediate-frequency signal;

a first lowpass filter for separating said real component of said ultimate intermediate-frequency signal from its image to generate a first lowpass filter response within said ultimate intermediate-frequency band;

a second lowpass filter for separating said imaginary component of said ultimate intermediate-frequency signal from its image to generate a second lowpass filter response within said ultimate intermediate-frequency band;

first analog-to-digital conversion circuitry for digitizing said first lowpass filter response to generate as an output signal thereof digitized samples of said real component of said ultimate intermediate-frequency signal, said first analog-to-digital conversion circuitry containing a number N of analog-to-digital converters for digitizing said first lowpass filter response on an N-phase basis, N being at least one;

second analog-to-digital conversion circuitry for digitizing said second lowpass filter response to generate as an output signal thereof digitized samples of said imaginary component of said ultimate intermediate-frequency signal, said second analog-to-digital conversion circuitry containing a number N of analog-to-digital converters for digitizing said second lowpass filter response on an N-phase basis;

circuitry for generating a complex digital carrier signal at the frequency of said radio carrier wave as translated to said ultimate intermediate-frequency band; and first digital synchrodyning circuitry responsive to said complex digital carrier signal supplied thereto as ultimate local oscillations, and to the digitized samples of said real and imaginary components of said ultimate intermediate-frequency signal, for recovering an in-phase baseband signal resulting from demodulating said amplitude modulation of said radio carrier wave selected by said tuner for reception.

* * * * *